(12) United States Patent
Hampel et al.

(10) Patent No.: US 11,765,723 B2
(45) Date of Patent: Sep. 19, 2023

(54) SCHEDULING VIA WIRELESS COMMUNICATION RELAY

(71) Applicant: QUALCOMM Incorporated, San Diego, CA (US)

(72) Inventors: Karl Georg Hampel, Hoboken, NJ (US); Vincent Loncke, Piscataway, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 16/948,990

(22) Filed: Oct. 8, 2020

(65) Prior Publication Data

US 2021/0112581 A1 Apr. 15, 2021

Related U.S. Application Data

(60) Provisional application No. 62/914,284, filed on Oct. 11, 2019.

(51) Int. Cl.
*H04W 72/00* (2023.01)
*H04W 72/20* (2023.01)
*H04L 5/00* (2006.01)
*H04W 72/21* (2023.01)
*H04W 72/23* (2023.01)

(52) U.S. Cl.
CPC .......... *H04W 72/20* (2023.01); *H04L 5/0048* (2013.01); *H04L 5/0055* (2013.01); *H04W 72/21* (2023.01); *H04W 72/23* (2023.01)

(58) Field of Classification Search
None
See application file for complete search history.

(56) References Cited

U.S. PATENT DOCUMENTS

| 8,451,769 B2* | 5/2013 | Lee | H04B 7/155 370/328 |
|---|---|---|---|
| 10,819,617 B1* | 10/2020 | Ghule | H04L 43/50 |
| 2010/0150173 A1* | 6/2010 | Yu | H04B 7/15528 370/474 |
| 2010/0159935 A1* | 6/2010 | Cai | H04W 72/23 455/450 |

(Continued)

OTHER PUBLICATIONS

International Search Report and Written Opinion—PCT/US2020/070644—ISA/EPO—Jan. 26, 2021.

*Primary Examiner* — Hassan A Phillips
*Assistant Examiner* — Gautam Sharma
(74) *Attorney, Agent, or Firm* — QUALCOMM Incorporated

(57) ABSTRACT

Various aspects of the present disclosure generally relate to wireless communication. In some aspects, a wireless communication relay may receive, via a first wireless link with a base station, a scheduling request that identifies scheduling information for scheduling transmission or reception of data via a second wireless link with a network node. The wireless communication relay may transmit, via the second wireless link, a scheduling command in accordance with the scheduling information. The wireless communication relay may transmit or receive, via the second wireless link, the data in accordance with the scheduling information. Numerous other aspects are provided.

30 Claims, 16 Drawing Sheets

(56) References Cited

U.S. PATENT DOCUMENTS

| | | | |
|---|---|---|---|
| 2010/0271999 A1* | 10/2010 | Yu | H04L 1/16 370/312 |
| 2011/0176477 A1* | 7/2011 | Lee | H04B 7/022 370/332 |
| 2011/0200137 A1 | 8/2011 | Han et al. | |
| 2011/0269393 A1* | 11/2011 | Ostergaard | H04B 7/155 455/7 |
| 2011/0317702 A1* | 12/2011 | Ho | H04L 12/44 370/392 |
| 2012/0069788 A1* | 3/2012 | Shen | H04W 74/006 370/315 |
| 2012/0069793 A1* | 3/2012 | Chung | H04L 27/2613 370/315 |
| 2012/0099515 A1* | 4/2012 | Chen | H04W 74/006 370/315 |
| 2012/0120866 A1 | 5/2012 | Cai et al. | |
| 2012/0147805 A1* | 6/2012 | Kim | H04W 72/20 370/312 |
| 2013/0003650 A1* | 1/2013 | Han | H04W 28/18 370/315 |
| 2013/0016649 A1* | 1/2013 | Damnjanovic | H04W 88/04 370/315 |
| 2013/0286927 A1* | 10/2013 | Jiao | H04L 12/189 370/312 |
| 2014/0233454 A1* | 8/2014 | Speight | H04B 7/15542 370/315 |
| 2014/0269455 A1* | 9/2014 | Kim | H04W 48/12 370/280 |
| 2015/0327235 A1* | 11/2015 | Morioka | H04W 72/042 370/329 |
| 2016/0286567 A1* | 9/2016 | Zander | H04B 7/15542 |
| 2017/0093480 A1* | 3/2017 | Ijaz | H04L 1/1854 |
| 2018/0317210 A1* | 11/2018 | Zhang | H04L 5/0053 |
| 2018/0324842 A1 | 11/2018 | Gulati et al. | |
| 2019/0059035 A1 | 2/2019 | Urabayashi et al. | |
| 2019/0110268 A1* | 4/2019 | Abedini | H04B 7/2606 |
| 2019/0132238 A1* | 5/2019 | Tang | H04L 1/1635 |
| 2019/0166640 A1* | 5/2019 | Wei | H04W 76/14 |
| 2020/0267075 A1* | 8/2020 | Tang | H04L 43/0847 |
| 2020/0366421 A1* | 11/2020 | Tang | H04W 4/40 |
| 2021/0096841 A1* | 4/2021 | Iwata | G06F 8/65 |
| 2021/0112581 A1* | 4/2021 | Hampel | H04B 7/15542 |
| 2021/0144719 A1* | 5/2021 | Choi | H04B 7/15542 |
| 2021/0226814 A1* | 7/2021 | Takaishi | H04L 12/4625 |
| 2021/0385158 A1* | 12/2021 | Hama | H04L 45/74 |

* cited by examiner

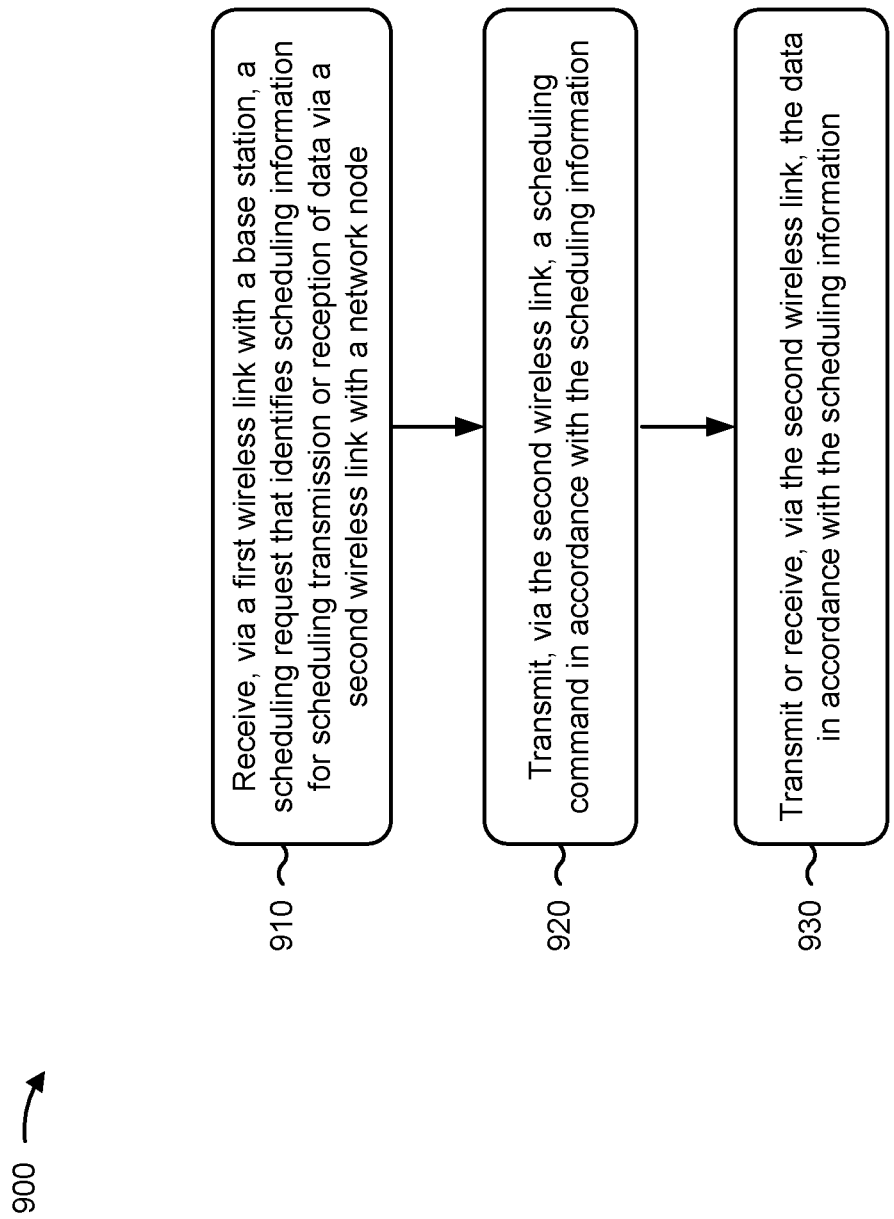

SCHEDULING VIA WIRELESS COMMUNICATION RELAY

CROSS-REFERENCE TO RELATED APPLICATION

This patent application claims priority to U.S. Provisional Patent Application No. 62/914,284, filed on Oct. 11, 2019, entitled "SCHEDULING VIA WIRELESS COMMUNICATION RELAY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for scheduling via wireless communication relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication relay, may include receiving, via a first wireless link with a base station, a scheduling request that identifies scheduling information for scheduling transmission or reception of data via a second wireless link with a network node; transmitting, via the second wireless link, a scheduling command in accordance with the scheduling information; and transmitting or receiving, via the second wireless link, the data in accordance with the scheduling information.

In some aspects, a method of wireless communication, performed by a base station, may include transmitting, via a first wireless link with a wireless communication relay, a scheduling request that identifies scheduling information for scheduling transmission or reception of data via a second wireless link between the wireless communication relay and a network node; and transmitting or receiving, via a third wireless link with the wireless communication relay, the data.

In some aspects, a wireless communication relay for wireless communication may include memory and one or more processors operatively coupled to the memory. The memory and the one or more processors may be configured to receive, via a first wireless link with a base station, a scheduling request that identifies scheduling information for scheduling transmission or reception of data via a second wireless link with a network node; transmit, via the second wireless link, a scheduling command in accordance with the scheduling information; and transmit or receive, via the second wireless link, the data in accordance with the scheduling information.

In some aspects, a base station for wireless communication may include memory and one or more processors operatively coupled to the memory. The memory and the one or more processors may be configured to transmit, via a first wireless link with a wireless communication relay, a scheduling request that identifies scheduling information for scheduling transmission or reception of data via a second wireless link between the wireless communication relay and a network node; and transmit or receive, via a third wireless link with the wireless communication relay, the data.

In some aspects, a non-transitory computer-readable medium may store one or more instructions for wireless communication. The one or more instructions, when executed by one or more processors of a wireless communication relay, may cause the one or more processors to: receive, via a first wireless link with a base station, a scheduling request that identifies scheduling information for scheduling transmission or reception of data via a second wireless link with a network node; transmit, via the second wireless link, a scheduling command in accordance with the scheduling information; and transmit or receive, via the second wireless link, the data in accordance with the scheduling information.

In some aspects, a non-transitory computer-readable medium may store one or more instructions for wireless communication. The one or more instructions, when executed by one or more processors of a base station, may cause the one or more processors to: transmit, via a first wireless link with a wireless communication relay, a scheduling request that identifies scheduling information for scheduling transmission or reception of data via a second wireless link between the wireless communication relay and a network node; and transmit or receive, via a third wireless link with the wireless communication relay, the data.

In some aspects, an apparatus for wireless communication may include means for receiving, via a first wireless link with a base station, a scheduling request that identifies scheduling information for scheduling transmission or reception of data via a second wireless link with a network node; means for transmitting, via the second wireless link, a scheduling command in accordance with the scheduling information; and means for transmitting or receiving, via the second wireless link, the data in accordance with the scheduling information.

In some aspects, an apparatus for wireless communication may include means for transmitting, via a first wireless link with a wireless communication relay, a scheduling request that identifies scheduling information for scheduling transmission or reception of data via a second wireless link between the wireless communication relay and a network node; and means for transmitting or receiving, via a third wireless link with the wireless communication relay, the data.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a wireless communication relay, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
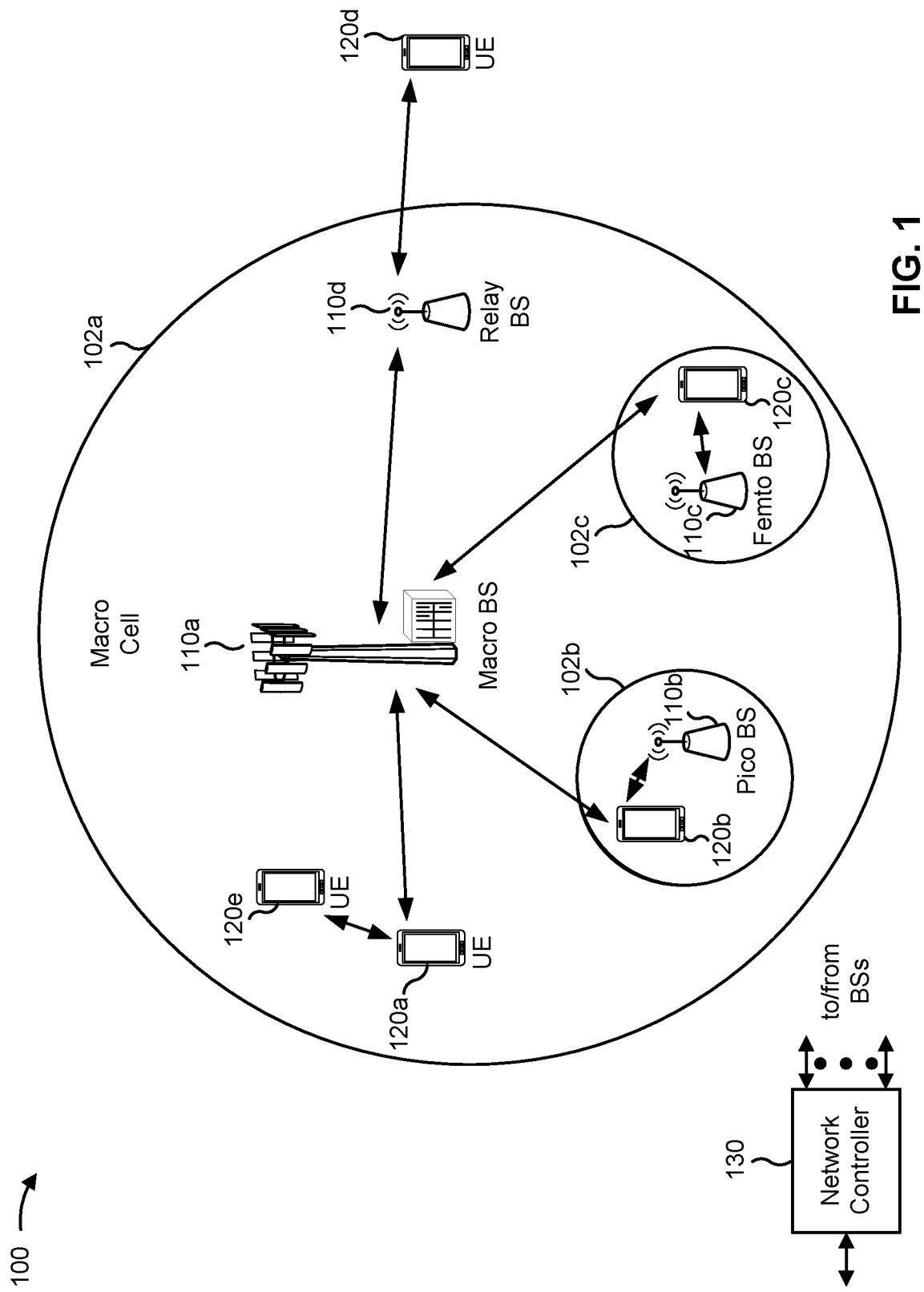
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
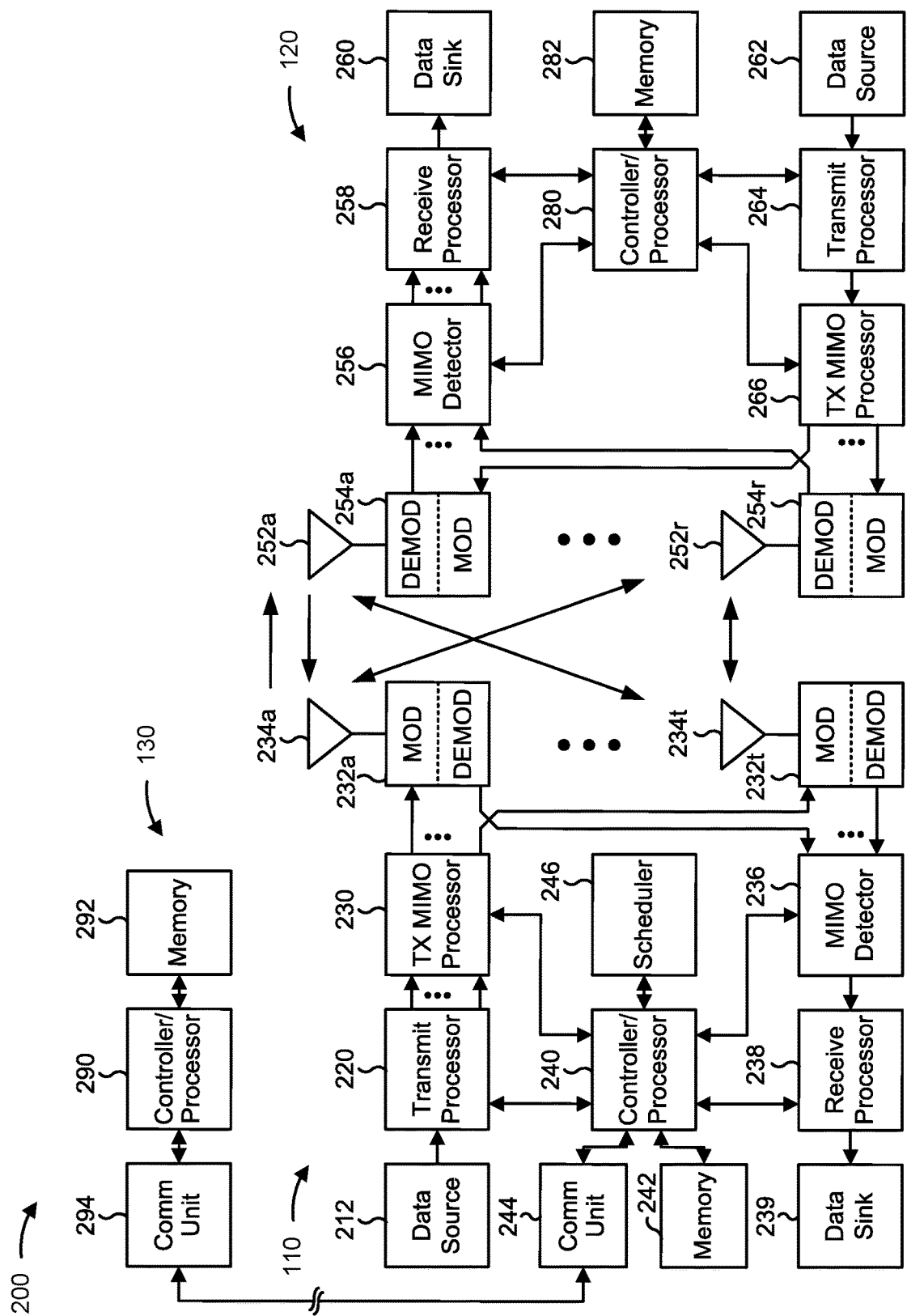
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with scheduling via wireless communication relay, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, a wireless communication relay (e.g., a base station 110, a UE 120, and/or the like) may include means for receiving, via a first wireless link with a base station, a scheduling request that identifies scheduling information for scheduling transmission or reception of data via a second wireless link with a network node, means for transmitting, via the second wireless link, a scheduling command in accordance with the scheduling information, means for transmitting or receiving, via the second wireless link, the data in accordance with the scheduling information, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a base station 110 may include means for transmitting, via a first wireless link with a wireless communication relay, a scheduling request that identifies scheduling information for scheduling transmission or reception of data via a second wireless link between the wireless communication relay and a network node, means for transmitting or receiving, via a third wireless link with the wireless communication relay, the data, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
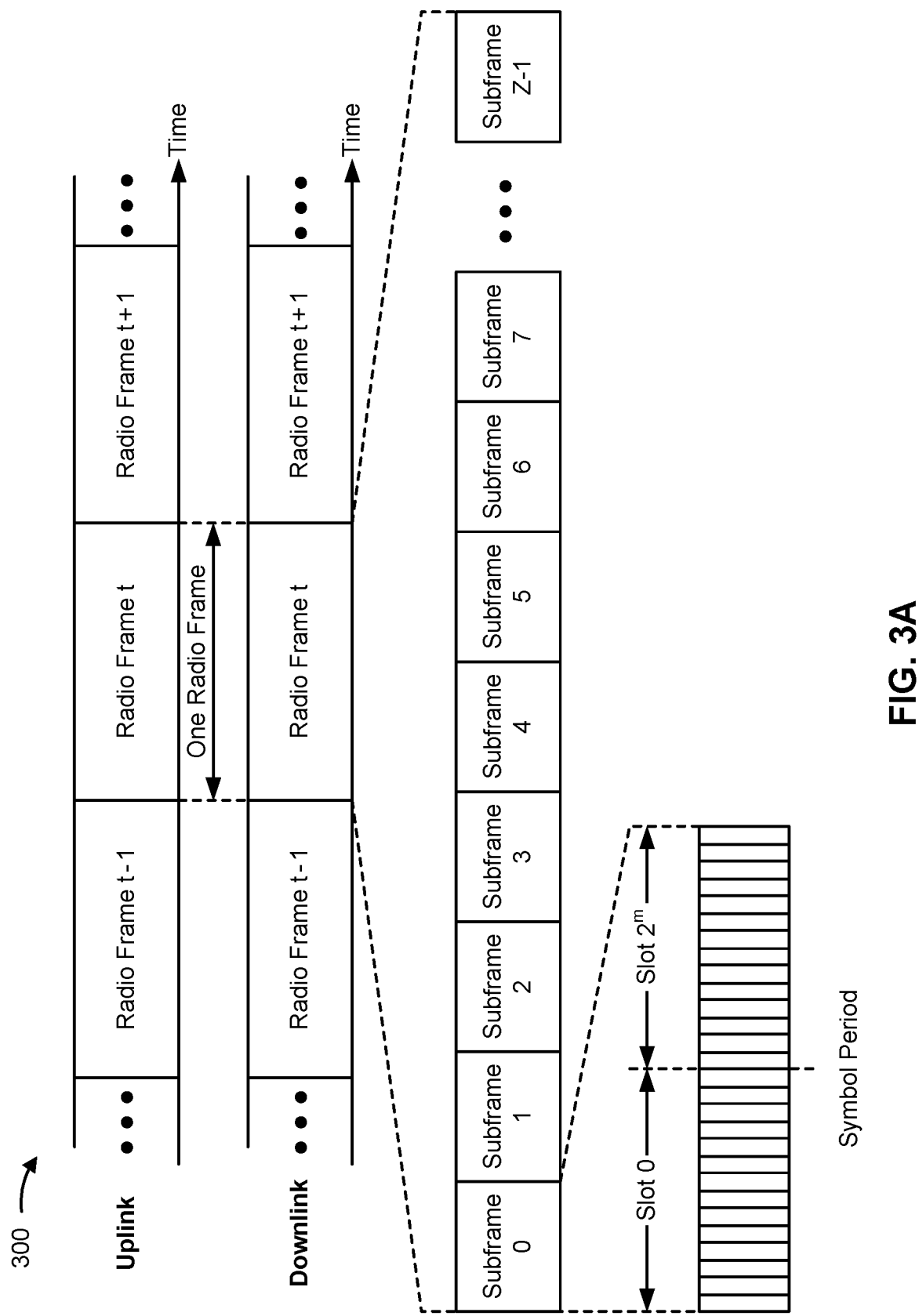
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
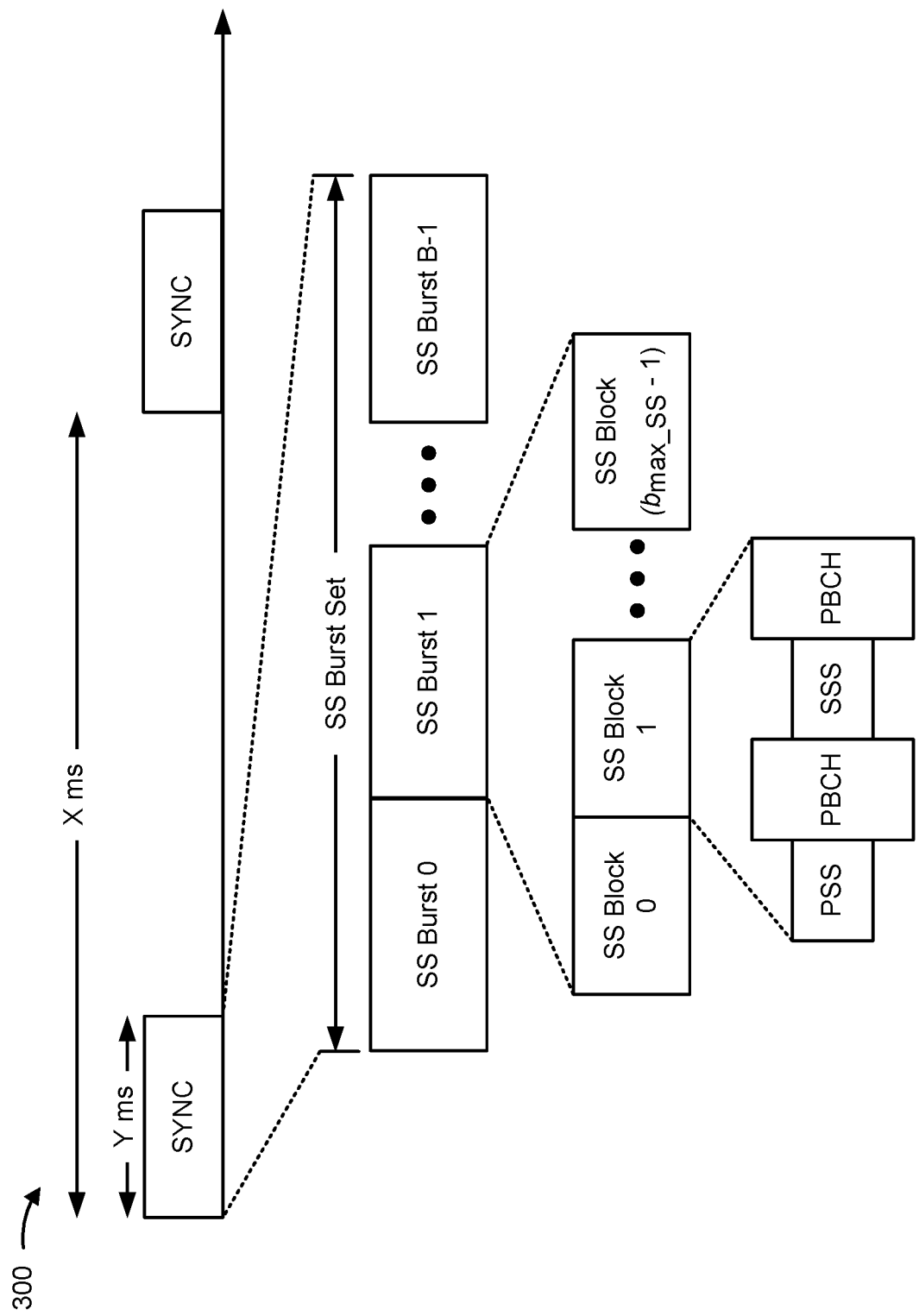
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_ss}$−1), where $b_{max\_ss}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
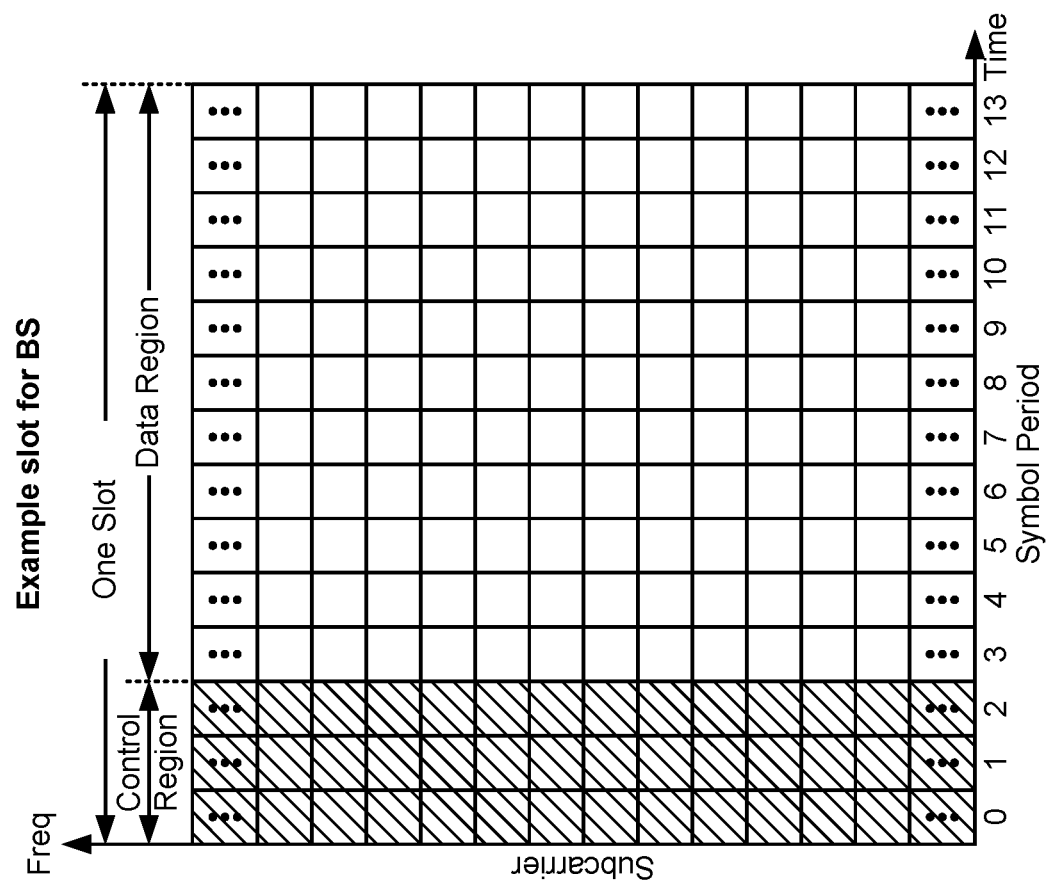
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
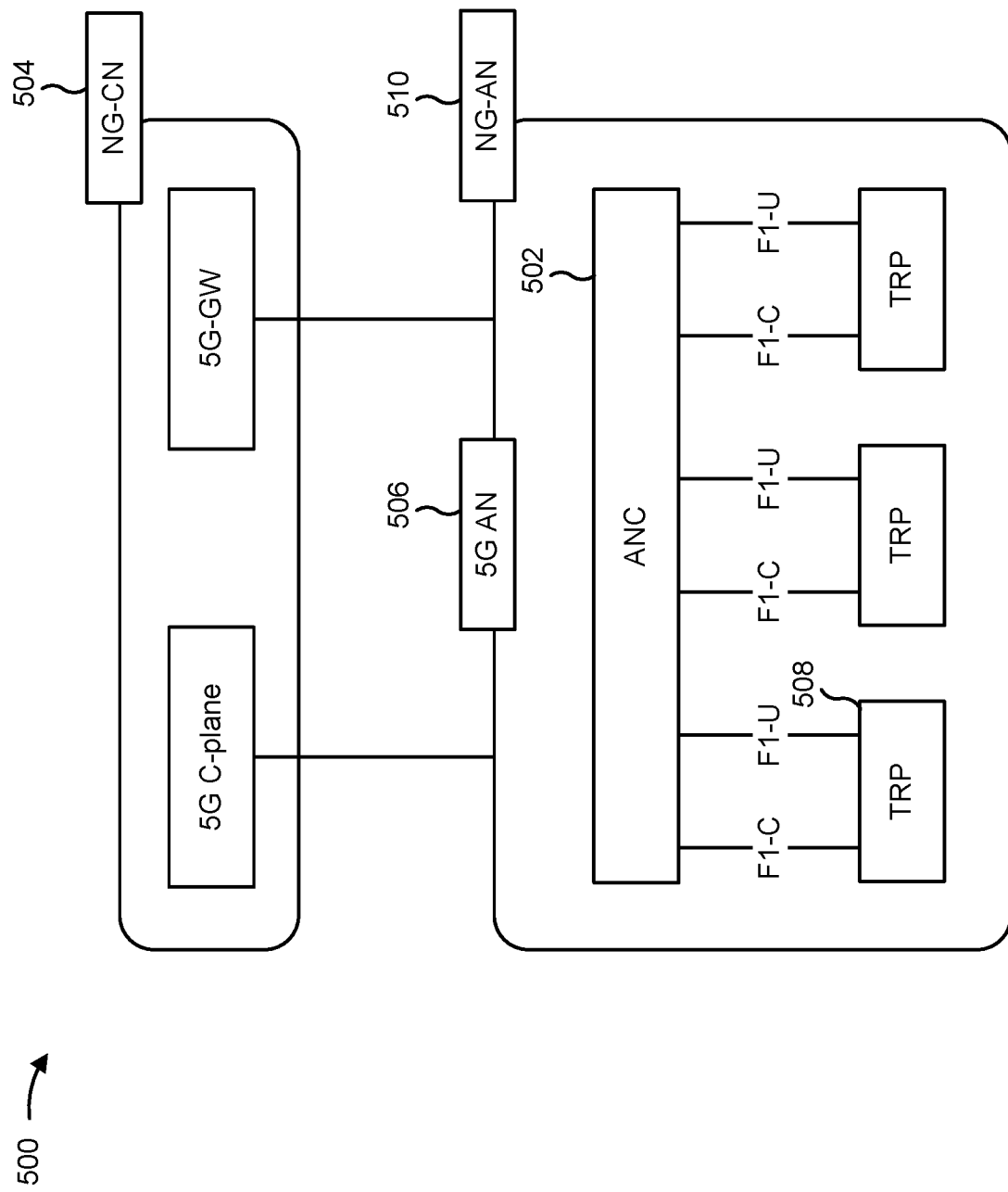
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6A:
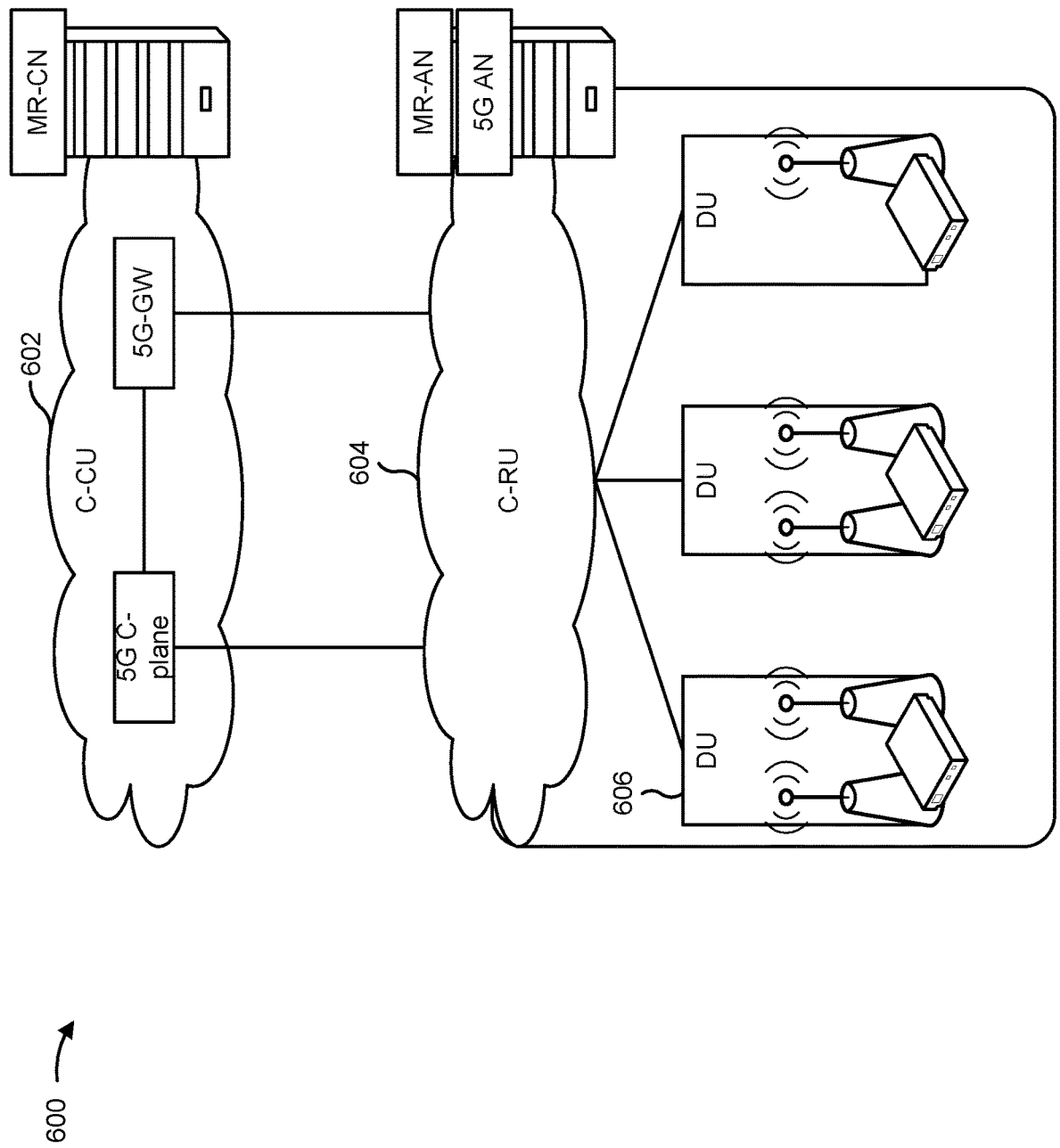
FIG. 6A illustrates an example physical architecture of a distributed RAN, in accordance with various aspects of the present disclosure.
Figure 6B:
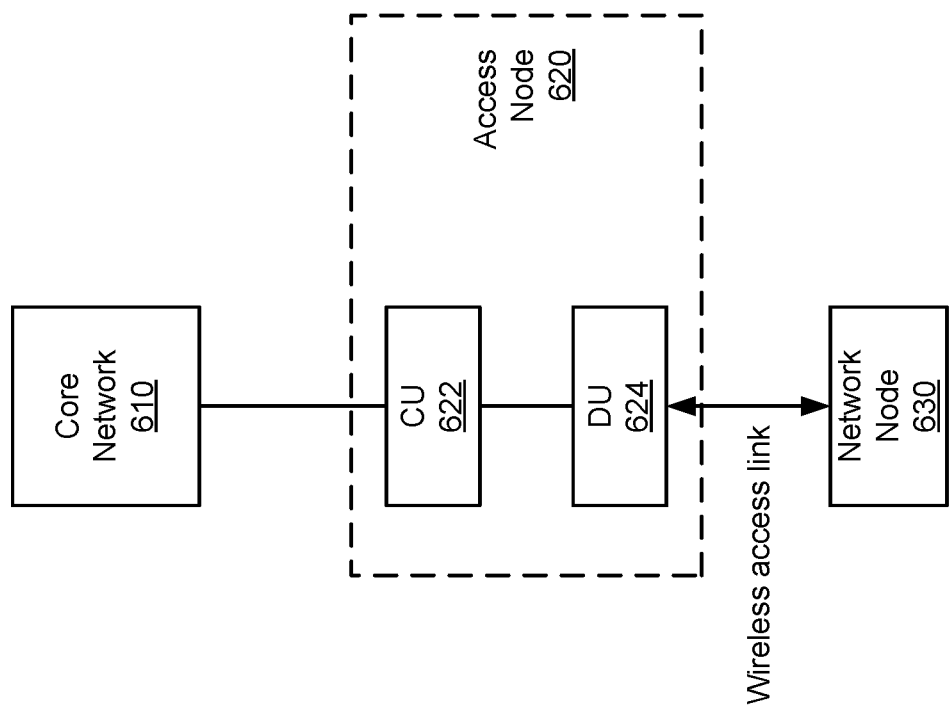
FIG. 6B illustrates an example architecture of a central unit—distributed unit (CU-DU) architecture for an access node, in accordance with certain aspects of the present disclosure.

FIGS. 6A and 6B illustrate an example physical architecture of a distributed RAN 600, according to aspects of the present disclosure. As shown in FIG. 6A, a centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

FIG. 6B illustrates an example architecture of a central unit-distributed unit (CU-DU) architecture for an access node, in accordance with certain aspects of the present disclosure. As shown in FIG. 6B, a core network 610 may communicate with a network node 630 via an access node 620. For example, the core network 610 may include an NG-CN and/or the like. The network node 630 may be the UE 120.

The access node 620 may include a CU 622 and a DU 624. The CU 622 may perform centralized control functions, such as configuration, generation and implementation of mapping rules, tracking topology of the wireless backhaul or fronthaul network, caching mapping information, caching multi-tunnel encapsulation information, and/or the like. In some aspects, the CU 622 may include a user-plane CU function and a control-plane CU function. The control-plane CU function may provide a configuration or configuration information for the user-plane CU function. The control-plane CU function may communicate control-plane information with network node 630 and/or one or more wireless communication relays in a control plane. The user-plane CU function may communicate with the network node 630 and/or one or more wireless communication relays in a data plane. For example, the user-plane CU may handle transport to and from the network node 630 and/or one or more wireless communication relays according to a configuration defined by and/or provided by the control-plane CU function. In some aspects, the CU 622 may communicate with the network node 630 via the DU 624.

As indicated above, FIGS. 6A and 6B are provided as examples. Other examples may differ from what is described with regard to FIGS. 6A and 6B.

Figure 7:
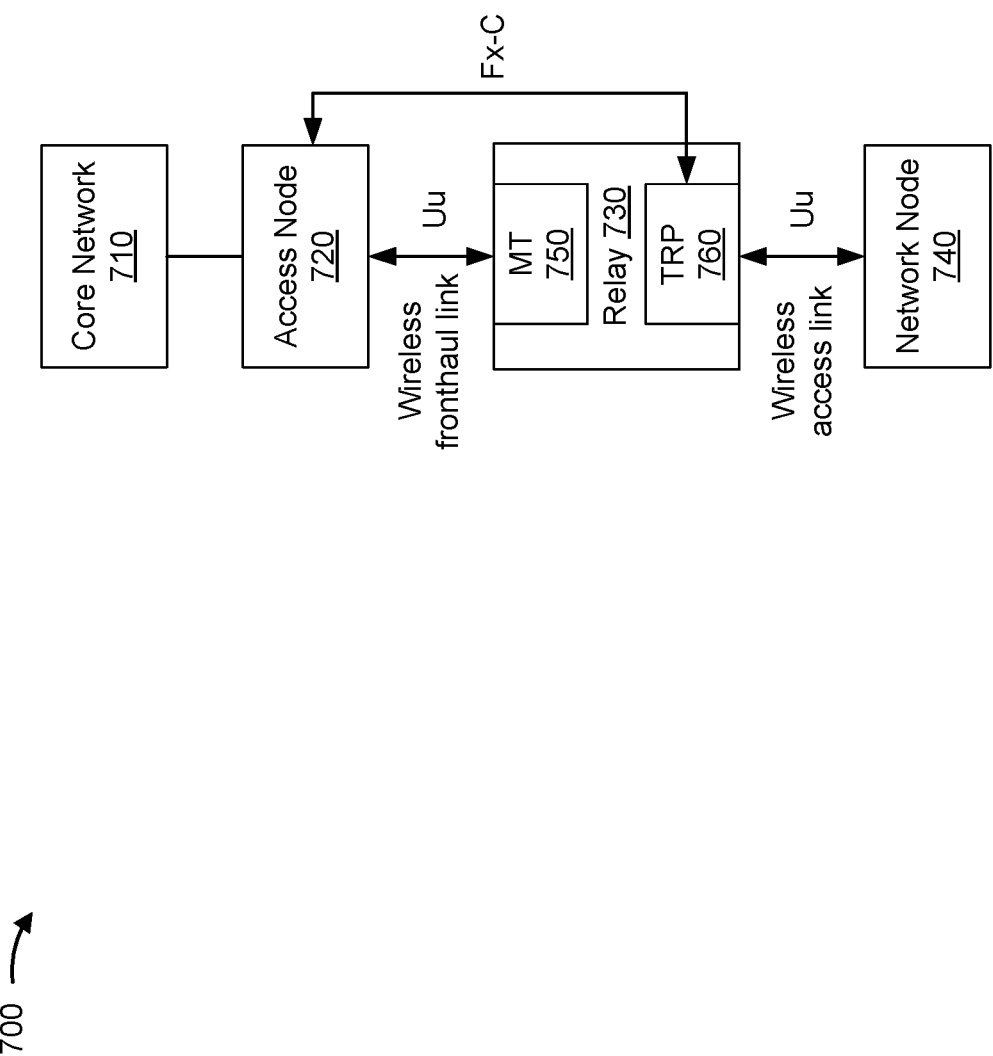
FIG. 7 illustrates an example of a wireless communication relay system using access nodes and wireless communication relays, in accordance with various aspects of the present disclosure.

FIG. 7 illustrates an example of a wireless communication relay system 700 using access nodes and wireless communication relays, in accordance with various aspects of the present disclosure.

As shown in FIG. 7, the wireless communication relay system 700 may include a core network 710, an access node 720, a wireless communication relay 730, and a network node 740. The core network 710 may include or may be similar to core network 610. The access node 720 is described in more detail with regard to access node 620 of FIG. 6B. The network node 740 may include or be similar to network node 630 and/or UE 120.

The wireless communication relay 730 includes one or more devices capable of receiving and providing data via a wireless link. For example, the wireless communication relay 730 may include a BS 110, an eNB, a gNB, a UE configured as a base station, a small cell, and/or a similar device.

The wireless communication relay 730 may include a mobile termination (MT) function (e.g., MT unit) 750 (also sometimes referred to as UE functions (UEF)), and a TRP function (e.g., TRP unit) 760 (also sometimes referred to as an access node function (ANF)). The MT function 750 may provide functions of a UE 120, as described above. The MT function 750 may be controlled and/or scheduled by the access node 720. The TRP function 760 may control and/or schedule other wireless communication relays 730 and/or the network node 740.

As shown in FIG. 7, the wireless communication relay 730 may have a wireless fronthaul link with the access node 720. In some aspects, multiple wireless communication relays 730 may provide multiple fronthaul links over multiple hops between the access node 720 and the network node 740. A wireless fronthaul link may provide the access node 720 with radio access to the network node 740 via the wireless communication relay 730, and optionally via one or more other wireless communication relays 730. In some aspects, the wireless fronthaul link may provide a Uu interface (e.g., an interface for uplink and/or downlink communication) or a PC5 interface (e.g., an interface for sidelink communication) for communication between the access node 720 and the wireless communication relay 730. The usage of wireless fronthaul links may be advantageous over wireline fronthaul links in situations with dense deployment of base stations. For example, in a millimeter wave (mmWave) deployment, base stations may be deployed densely, which may create problems if wireline fronthaul is used.

As further shown in FIG. 7, the TRP function 760 of the wireless communication relay 730 may have a connection to the access node 720. For example, the access node 720 and the TRP function 420 may be connected by a fronthaul signaling interface, such as a fronthaul control plane (Fx-C) signaling interface.

As further shown in FIG. 7, wireless communication relay 730 may have a wireless access link with the network node 740. The wireless access link may provide the network node 740 with radio access to the access node 720 via wireless communication relay 730, and optionally via one or more wireless communication relays 730. In some aspects, the wireless access link may provide a Uu interface or a PC5 interface for communication between the wireless communication relay 730 and the network node 740.

In this way, the wireless communication relay system 700 may provide improved coverage, particularly for mmWave communication. However, in current wireless communication relay systems, a wireless communication relay may perform scheduling of communications with a network node (e.g., a UE), such that scheduling of the network node is not controlled by an access node. Accordingly, in a network with multiple wireless communication relays, scheduling may lack coordination and operate with reduced efficiency due to a lack of centralized control. Some techniques and apparatuses described herein enable an access node to control and/or schedule communications of a network node (e.g., a UE) via a wireless communication relay. In this way, the wireless communication relay may be transparent to the network node, and the access node may provide centralized control of network node scheduling, thereby improving efficiency.

As indicated above, FIG. 7 is provided as an example. Other examples may differ from what is described with regard to FIG. 7.

Figure 8A:
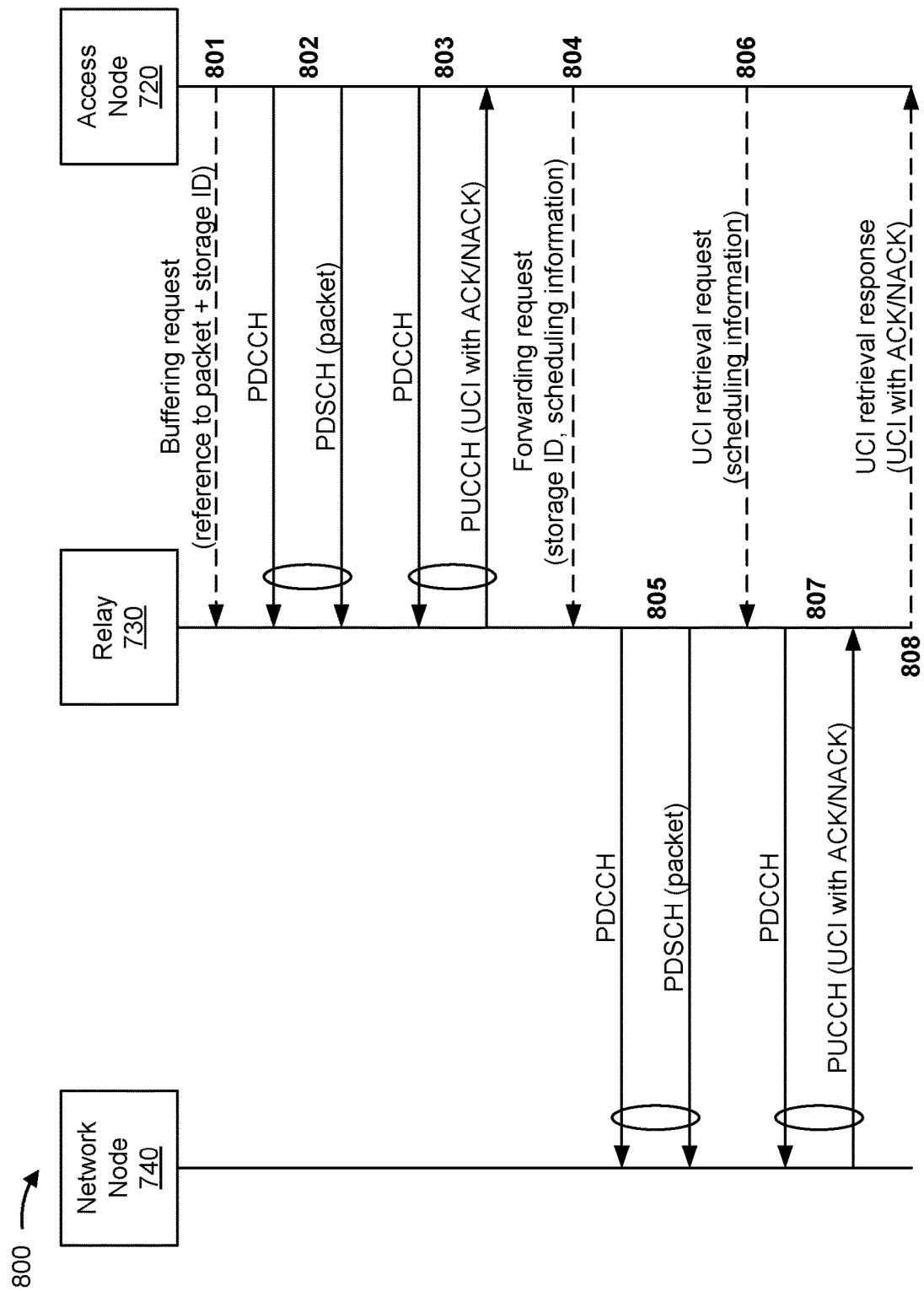
FIGS. 8A-8C illustrate examples of scheduling via wireless communication relay, in accordance with various aspects of the present disclosure.
Figure 8B:
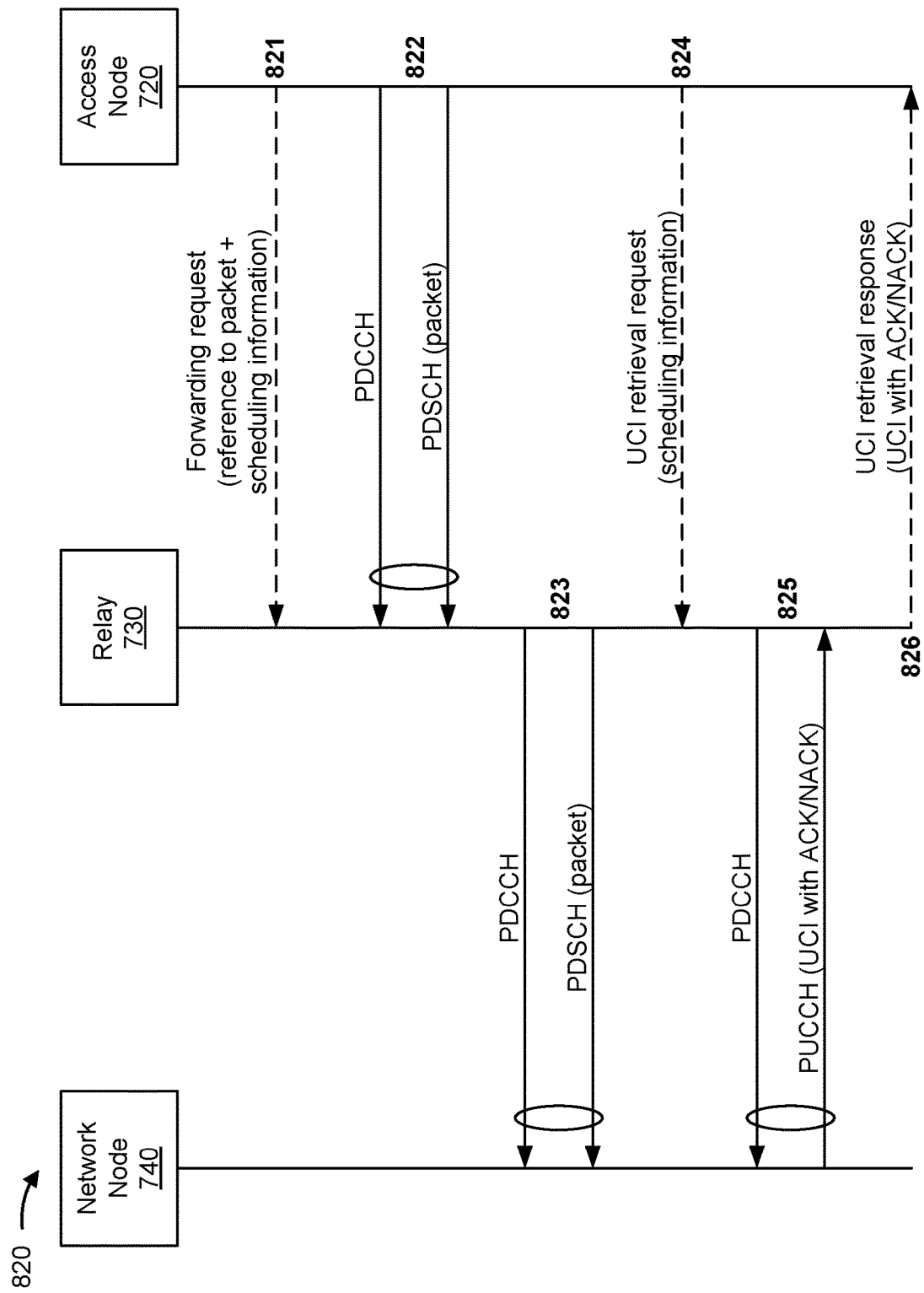
Figure 8C:
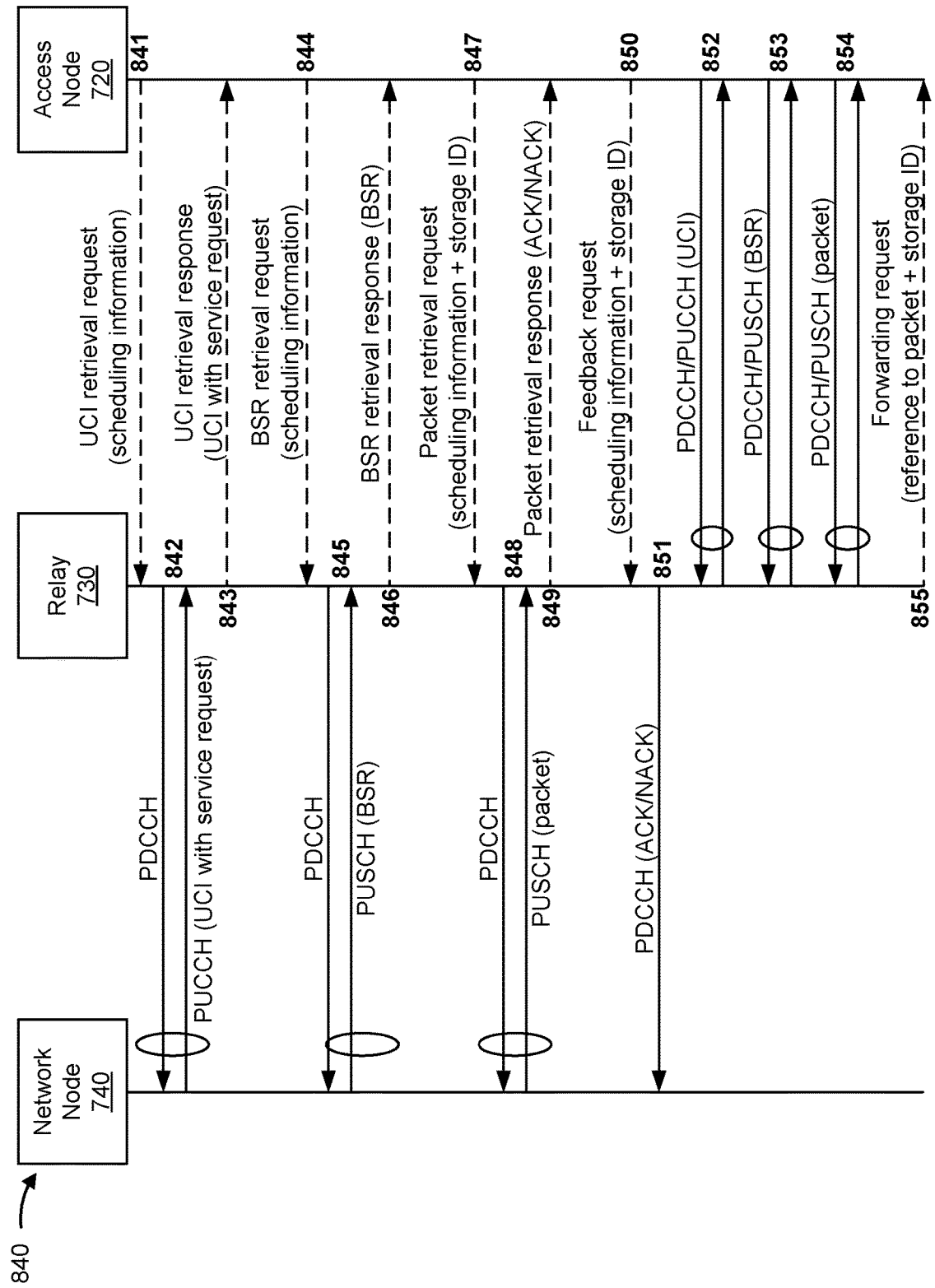

FIGS. 8A-8C are diagrams illustrating examples 800, 820, and 840, respectively, of scheduling via wireless communication relay, in accordance with various aspects of the present disclosure. In particular, FIGS. 8A and 8B show downlink scheduling via wireless communication relay, and FIG. 8C shows uplink scheduling via wireless communication relay, in accordance with various aspects of the present disclosure.

As shown in FIGS. 8A-8C, a wireless communication relay 730 may communicate with an access node 720 to schedule communications of a network node 740. The access node 720 and the wireless communication relay 730 may communicate via a first wireless link (shown in dashed line), such as a wireless signaling link. The wireless communication relay 730 and the network node 740 may communicate via a second wireless link, such as a wireless access link (shown in solid lines between the network node 740 and the wireless communication relay 730). Additionally, the access node 720 and the wireless communication relay 730 may communicate via a third wireless link, such as a wireless fronthaul link (shown in solid lines between the wireless communication relay 730 and the access node 720).

The wireless fronthaul link, the wireless access link, and/or the wireless signaling link may support a physical downlink control channel (PDCCH), a physical uplink control channel (PUCCH), a physical downlink shared channel (PDSCH), a physical uplink shared channel (PUSCH), and/or a sidelink channel (e.g., using a 5G RAT, a 4G RAT, and/or the like). In some aspects, the wireless fronthaul link and/or the wireless access link may provide a time-slotted cellular interface. For example, the wireless fronthaul link and/or the wireless backhaul link may provide a Uu or a PC5 interface. As another example, the wireless signaling link may provide a control signaling interface, such as an Fx-C signaling interface. In some aspects, communications on the wireless fronthaul link, the wireless access link, and/or the wireless signaling link may be multiplexed in time or frequency. For example, the communications may be multiplexed using different frequency bands, different time slots, different bandwidth parts, and/or different resource blocks. As another example, the communications may be multiplexed using licensed frequency band and unlicensed frequency band.

In some aspects, the wireless communication relay 730 may include a relay base station 110*d*. In some aspects, the access node 720 may include the access node 620, a base station 110 (e.g., a gNB), or one or more functions of a base station 110. For example, the access node 720 may include a CU and a DU of a base station 110. As another example, the access node 720 may include a DU of a base station 110. In such a case, the access node 720 may include a DU function of an integrated access and backhaul (IAB) node. In some aspects, the network node 740 may include the network node 630, a UE 120, or another wireless communication relay 730 (e.g., an MT unit, such as an MT function 750, of another wireless communication relay 730).

In some aspects, the access node 720 and the wireless communication relay 730 may employ an integrated access and fronthaul (IAF) split architecture. For example, the access node 720 and the wireless communication relay 730 may employ a split architecture according to IAF Option 6 (e.g., in connection with FIGS. 8A and 8C) or IAF Option 5 (e.g., in connection with FIGS. 8B and 8C). In Option 5, a lower MAC layer, a physical layer, and a radio frequency (RF) layer may be implemented by the wireless communication relay 730. In Option 6, a physical layer and an RF layer may be implemented by the wireless communication relay 730. In some aspects, the access node 720 and the wireless communication relay 730 may employ a split architecture (e.g., in connection with FIGS. 8A-8C) whereby Option 5 is used for user plane traffic and Option 6 is used for control plane traffic.

As shown in FIG. 8A, and by reference number 801, the access node 720 may transmit, and the wireless communication relay 730 may receive, a message (e.g., a PDCCH communication, downlink control information (DCI) in a PDCCH, a medium access control control element (MAC CE) in a PDSCH, and/or the like) associated with a buffering request. For example, the access node 720 may transmit the message to the wireless communication relay 730 via the wireless signaling link. The buffering request may provide an indication that the wireless communication relay 730 is to store (e.g., buffer) a packet (i.e., data), that will be transmitted by the access node 720.

In such a case, the buffering request may identify a reference for the packet that the wireless communication relay 730 may use to identify the packet when the packet is received from the access node 720. The reference may be an explicit or an implicit reference to the packet that enables the wireless communication relay 730 to distinguish the packet from other packets received from the access node 720. For example, the reference may be a slot or a resource in which the wireless communication relay 730 will receive the packet, or the reference may be an identifying (e.g., distinguishing) portion of the packet (e.g., an identifying portion of the packet's content).

Moreover, the buffering request may identify a storage identifier for the packet, which the wireless communication relay 730 is to use (e.g., to generate a mapping of the storage identifier to a storage location of the packet) when storing the packet. The storage identifier may be a packet identifier, a transport block identifier, a code block group identifier, a code block identifier, a hybrid automatic repeat request (HARD) process identifier, and/or the like. In some aspects, the access node 720 may store information that associates the storage identifier with the wireless communication relay 730.

As shown by reference number 802, the access node 720 may transmit, and the wireless communication relay 730 may receive, via the wireless fronthaul link, a communication (e.g., a scheduling command) that schedules transmission of the packet from the access node 720 to the wireless communication relay 730. For example, the wireless communication relay 730 may receive a PDCCH communication of DCI that is scrambled using an identifier (e.g., a radio network temporary identifier (RNTI)) associated with the wireless communication relay 730. In addition, the wireless communication relay 730 may receive the PDCCH communication via a particular beam.

The access node 720 may transmit, and the wireless communication relay 730 may receive, via the wireless fronthaul link, the packet in accordance with the scheduling (e.g., provided by the PDCCH communication). For example, the wireless communication relay 730 may receive the packet in a PDSCH (e.g., via the beam in which the PDCCH was received). In some aspects, the PDCCH scheduling the packet and the PDSCH carrying the packet may be multiplexed. For example, the wireless communication relay 730 may receive the PDCCH and the PDSCH in the same slot (e.g., a slot that is the reference for the packet). In some aspects, the packet may contain user data or a channel state information reference signal (i.e., data).

In some aspects, the wireless communication relay 730 may decode the packet. In some aspects, the wireless communication relay 730 may identify the packet (e.g., after decoding the packet) based at least in part on the reference identified in the buffering request. For example, the wireless communication relay 730 may identify that the packet is to be stored, in association with the storage identifier, based at least in part on the reference. In some aspects, the wireless communication relay 730 may identify the packet based on a slot or a resource in which the packet was received (e.g., as indicated by the reference). In some aspects, the wireless communication relay 730 may identify the packet based on an identifying portion of the packet (e.g., as indicated by the reference).

After identifying the packet, the wireless communication relay 730 may store the packet in association with the storage identifier identified in the buffering request. For example, the wireless communication relay 730 may generate a mapping of the storage identifier to a storage location of the packet. In some aspects, the wireless communication relay 730 may be unable to decode the packet and may not store the packet.

As shown by reference number 803, the access node 720 may transmit, and the wireless communication relay 730 may receive, via the wireless fronthaul link, a communication (e.g., a scheduling command) that schedules transmission of uplink control information (UCI) (i.e., data) from the wireless communication relay 730 to the access node 720. For example, the wireless communication relay 730 may receive a PDCCH communication, as described above, that schedules transmission of the UCI.

The wireless communication relay 730 may transmit, and the access node 720 may receive, via the wireless fronthaul link, the UCI in accordance with the scheduling (e.g., provided by the PDCCH communication). For example, the wireless communication relay 730 may transmit the UCI in a PUCCH (e.g., via a beam corresponding to the beam in which the PDCCH was received). In some aspects, the PDCCH scheduling the UCI and the PUCCH carrying the UCI may be multiplexed (e.g., in the same slot).

The UCI may indicate acknowledgment (ACK) or negative ACK (NACK) feedback for the packet transmitted by the access node 720. For example, if the wireless communication relay 730 was able to decode and/or store the packet, the UCI may include ACK feedback, and if the wireless communication relay 730 was unable to decode and/or store the packet, the UCI may include NACK feedback. If NACK feedback is provided by the wireless communication relay 730, the access node 720 may transmit a new buffering request, as described above.

As shown by reference number 804, the access node 720 may transmit, and the wireless communication relay 730 may receive, a message (e.g., a PDCCH communication, DCI in a PDCCH, a MAC CE in a PDSCH, and/or the like) associated with a forwarding request. For example, the access node 720 may transmit the message to the wireless communication relay 730 via the wireless signaling link. The forwarding request may provide an indication that the wireless communication relay 730 is to forward the stored packet to the network node 740. In some aspects, the access node 720 may provide the forwarding request if ACK feedback for the packet is provided by the wireless communication relay 730.

The forwarding request may identify scheduling information for scheduling transmission of the packet to the network node 740 (e.g., the forwarding request may be a scheduling request, which may include a request to schedule a communication for the network node 740). The scheduling information may be included in the message for the forwarding request (e.g., in a PDCCH communication, DCI, a MAC CE, and/or the like), or may be transmitted separately in a PDCCH communication, DCI in a PDCCH, a MAC CE in a PDSCH, and/or the like. In some aspects, the scheduling request may indicate scheduling for transmission of the scheduling information to the wireless communication relay 730. In some aspects, the scheduling request and/or scheduling information (e.g., in a PDCCH and/or DCI) may be received by the wireless communication relay 730 in particular resources indicating that the scheduling information is for forwarding to the network node 740 and is not for scheduling the wireless communication relay 730. In some aspects, the scheduling request and the scheduling information may be multiplexed (e.g., in the same slot). The scheduling information may identify a resource (e.g., a slot) that is to be used to schedule transmission of the packet and/or transmit the packet, an identifier (e.g., an RNTI) associated with the network node 740, DCI that is to be transmitted to the network node 740, a beam (e.g., a beam identifier of the beam) that is to be used to schedule transmission of the packet and/or transmit the packet, and/or the like.

Moreover, the forwarding request may identify the storage identifier for the packet. That is, the forwarding request may identify the same storage identifier that was indicated by the buffering request for the packet. Accordingly, based at least in part on receiving the forwarding request, the wireless communication relay 730 may obtain the packet from storage according to the storage identifier. In addition, the wireless communication relay 730 may re-encode the packet after obtaining the packet from storage.

As shown by reference number 805, the wireless communication relay 730 may transmit (e.g., based at least in part on receiving the forwarding request), and the network node 740 may receive, via the wireless access link, a communication (e.g., a scheduling command) that schedules transmission of the packet from the wireless communication relay 730 to the network node 740. For example, the wireless communication relay 730 may transmit a PDCCH communication that schedules transmission of the packet. The communication that schedules transmission of the packet may be in accordance with the scheduling information of the forwarding request. For example, the wireless communication relay 730 may transmit, in a resource (e.g., a slot) identified by the scheduling information and using a beam identified by the scheduling information, a PDCCH communication that includes DCI identified by the scheduling information that is scrambled using the identifier (e.g., the RNTI) identified in the scheduling information.

The wireless communication relay 730 may transmit, and the network node 740 may receive, via the wireless access link, the packet in accordance with the scheduling (e.g., provided by the PDCCH communication). For example, the wireless communication relay 730 may transmit the packet in a PDSCH (e.g., via the beam in which the PDCCH was transmitted). In some aspects, the PDCCH scheduling the packet and the PDSCH carrying the packet may be multiplexed. For example, the wireless communication relay 730 may transmit the PDCCH and the PDSCH in the same slot (e.g., the slot identified by the scheduling information). In some aspects, the network node 740 may decode the received packet. In some aspects, the network node 740 may be unable to decode the received packet.

As shown by reference number 806, the access node 720 may transmit, and the wireless communication relay 730 may receive, a message (e.g., a PDCCH communication, DCI in a PDCCH, a MAC CE in a PDSCH, and/or the like) associated with a UCI retrieval request. For example, the access node 720 may transmit the message to the wireless communication relay 730 via the wireless signaling link. The UCI retrieval request may provide an indication that the wireless communication relay 730 is to obtain UCI (i.e., data) providing ACK or NACK feedback from the network node 740.

The UCI retrieval request may identify scheduling information for scheduling transmission of the UCI from the network node 740 (e.g., the UCI retrieval request may be a scheduling request). The scheduling information may identify a resource, an identifier (e.g., an RNTI) associated with the network node 740, DCI, a beam, and/or the like, as described above.

As shown by reference number 807, the wireless communication relay 730 may transmit (e.g., based at least in part on receiving the UCI retrieval request), and the network node 740 may receive, via the wireless access link, a communication (e.g., a scheduling command) that schedules transmission of the UCI from the network node 740 to the wireless communication relay 730. For example, the wireless communication relay 730 may transmit a PDCCH communication, as described above, that schedules transmission of the UCI. The communication that schedules transmission of the UCI may be in accordance with the scheduling information of the UCI retrieval request, as described above.

The network node 740 may transmit, and the wireless communication relay 730 may receive, via the wireless access link, the UCI in accordance with the scheduling (e.g., provided by the PDCCH communication). For example, the network node 740 may transmit the UCI in a PUCCH (e.g., via a beam corresponding to the beam in which the PDCCH was received). In some aspects, the PDCCH scheduling the UCI and the PUCCH carrying the UCI may be multiplexed (e.g., in the same slot). In some aspects, if the network node 740 was able to decode the packet, the UCI may include ACK feedback, and if the network node 740 was unable to decode the packet, the UCI may include NACK feedback.

As shown by reference number 808, the wireless communication relay 730 may transmit, and the access node 720 may receive, a message (e.g., UCI in a PUCCH or PUSCH) associated with a UCI retrieval response. For example, the wireless communication relay 730 may transmit the message to the access node 720 via the wireless signaling link. The UCI retrieval response may identify the ACK or NACK feedback provided by the network node 740 in the UCI. If NACK feedback is identified, the access node 720 may transmit a new forwarding request, as described above. In this way, the access node 720 may schedule downlink transmissions to the network node 740 via the wireless communication relay 730, thereby maintaining centralized control and improving scheduling efficiency.

As shown in FIG. 8B, and by reference number 821, the access node 720 may transmit, and the wireless communication relay 730 may receive, a message (e.g., a PDCCH communication, DCI in a PDCCH, a MAC CE in a PDSCH, and/or the like) associated with a forwarding request. For example, the access node 720 may transmit the message to the wireless communication relay 730 via the wireless signaling link. The forwarding request may provide an indication that the wireless communication relay 730 is to forward a packet (i.e., data) to the network node 740. In the example 820 of FIG. 8B, the forwarding request may not be preceded by a buffering request, as described above in connection with FIG. 8A. Accordingly, the forwarding request may include a reference for the packet that the wireless communication relay 730 may use to identify the packet when the packet is received from the access node 720, as described above in connection with FIG. 8A.

In addition, the forwarding request may identify scheduling information for scheduling transmission of the packet to the network node 740 (e.g., the forwarding request may be a scheduling request). For example, the scheduling information may identify a resource, an identifier (e.g., an RNTI) associated with the network node 740, DCI, a beam, and/or the like, as described above in connection with FIG. 8A.

As shown by reference number 822, the access node 720 may transmit, and the wireless communication relay 730 may receive, via the wireless fronthaul link, a communication (e.g., a scheduling command) that schedules transmission of the packet from the access node 720 to the wireless communication relay 730, as described above in connection with FIG. 8A. The access node 720 may transmit, and the wireless communication relay 730 may receive, via the wireless fronthaul link, the packet in accordance with the scheduling, as described above in connection with FIG. 8A. In some aspects, the packet may contain user data or a channel state information reference signal (i.e., data).

In some aspects, the wireless communication relay 730 may decode the packet. In some aspects, the wireless communication relay 730 may identify the packet (e.g., after decoding the packet) based at least in part on the reference identified in the forwarding request, as described above in connection with FIG. 8A. In the example 820 of FIG. 8B, the wireless communication relay 730, rather than storing the packet, may forward the packet to the network node upon receiving the packet from the access node 720. Accordingly, the wireless communication relay 730 may re-encode the packet prior to forwarding the packet.

As shown by reference number 823, the wireless communication relay 730 may transmit (e.g., based at least in part on receiving the forwarding request), and the network node 740 may receive, via the wireless access link, a communication (e.g., a scheduling command) that schedules transmission of the packet from the wireless communication relay 730 to the network node 740, as described above in connection with FIG. 8A. The wireless communication relay 730 may transmit, and the network node 740 may receive, via the wireless access link, the packet in accordance with the scheduling, as described above in connection with FIG. 8A.

As shown by reference number 824, the access node 720 may transmit, and the wireless communication relay 730 may receive, a message (e.g., a PDCCH communication, DCI in a PDCCH, a MAC CE in a PDSCH, and/or the like) associated with a UCI retrieval request (e.g., via the wireless signaling link), as described above in connection with FIG. 8A.

As shown by reference number 825, the wireless communication relay 730 may transmit, and the network node 740 may receive, via the wireless access link, a communication (e.g., a scheduling command) that schedules transmission of the UCI from the network node 740 to the wireless communication relay 730, as described above in connection with FIG. 8A. The network node 740 may transmit, and the wireless communication relay 730 may receive, via the wireless access link, the UCI in accordance with the scheduling, as described above in connection with FIG. 8A.

As shown by reference number 826, the wireless communication relay 730 may transmit, and the access node 720 may receive, a message (e.g., UCI in a PUCCH or PUSCH) associated with a UCI retrieval response (e.g., via the wireless signaling link), as described above in connection with FIG. 8A. In this way, the access node 720 may schedule downlink transmissions to the network node 740 via the wireless communication relay 730, thereby maintaining centralized control and improving scheduling efficiency.

As shown in FIG. 8C, and by reference number 841, the access node 720 may transmit, and the wireless communication relay 730 may receive, a message (e.g., a PDCCH communication, DCI in a PDCCH, a MAC CE in a PDSCH, and/or the like) associated with a UCI retrieval request. For example, the access node 720 may transmit the message to the wireless communication relay 730 via the wireless signaling link. The UCI retrieval request may provide an indication that the wireless communication relay 730 is to obtain UCI (i.e., data) from the network node 740.

The UCI retrieval request may identify scheduling information for scheduling transmission of the UCI from the network node 740 (e.g., the UCI retrieval request may be a scheduling request). The scheduling information may identify a resource, an identifier (e.g., an RNTI) associated with the network node 740, DCI, a beam, and/or the like, as described above in connection with FIG. 8A.

As shown by reference number 842, the wireless communication relay 730 may transmit (e.g., based at least in part on receiving the UCI retrieval request), and the network node 740 may receive, via the wireless access link, a communication (e.g., a scheduling command) that schedules transmission of the UCI from the network node 740 to the wireless communication relay 730. For example, the wireless communication relay 730 may transmit a PDCCH communication, as described above in connection with FIG. 8A, that schedules transmission of the UCI. The communication that schedules transmission of the UCI may be in accordance with the scheduling information of the UCI retrieval request, as described above in connection with FIG. 8A.

The network node 740 may transmit, and the wireless communication relay 730 may receive, via the wireless access link, the UCI in accordance with the scheduling (e.g., provided by the PDCCH communication). For example, the network node 740 may transmit the UCI in a PUCCH (e.g., via a beam corresponding to the beam in which the PDCCH was received). In some aspects, the PDCCH scheduling the UCI and the PUCCH carrying the UCI may be multiplexed (e.g., in the same slot). In some aspects, the UCI transmitted by the network node 740 may include a service request for an uplink transmission of the network node 740.

As shown by reference number 843, the wireless communication relay 730 may transmit, and the access node 720 may receive, a message (e.g., UCI in a PUCCH or PUSCH) associated with a UCI retrieval response. For example, the wireless communication relay 730 may transmit the message to the access node 720 via the wireless signaling link. The UCI retrieval response may indicate the service request provided by the network node 740 in the UCI.

As shown by reference number 844, the access node 720 may transmit (e.g., based on receiving the service request), and the wireless communication relay 730 may receive, a message (e.g., a PDCCH communication, DCI in a PDCCH, a MAC CE in a PDSCH, and/or the like) associated with a buffer status report (BSR) retrieval request. For example, the access node 720 may transmit the message to the wireless communication relay 730 via the wireless signaling link. The BSR retrieval request may provide an indication that the wireless communication relay 730 is to obtain a BSR (i.e., data) from the network node 740.

The BSR retrieval request may identify scheduling information for scheduling transmission of the BSR from the network node 740 (e.g., the BSR retrieval request may be a scheduling request). The scheduling information may identify a resource, an identifier (e.g., an RNTI) associated with the network node 740, DCI, a beam, and/or the like, as described above in connection with FIG. 8A.

As shown by reference number 845, the wireless communication relay 730 may transmit (e.g., based at least in part on receiving the BSR retrieval request), and the network node 740 may receive, via the wireless access link, a communication (e.g., a scheduling command) that schedules transmission of the BSR from the network node 740 to the wireless communication relay 730. For example, the wireless communication relay 730 may transmit a PDCCH communication, as described above in connection with FIG. 8A, that schedules transmission of the BSR. The communication that schedules transmission of the BSR may be in accordance with the scheduling information of the BSR retrieval request, as described above in connection with FIG. 8A.

The network node 740 may determine a BSR and may transmit, and the wireless communication relay 730 may receive, via the wireless access link, the BSR in accordance with the scheduling (e.g., provided by the PDCCH communication). For example, the network node 740 may transmit the BSR in a PUSCH (e.g., via a beam corresponding to the beam in which the PDCCH was received). In some aspects, the PDCCH scheduling the BSR and the PUSCH carrying the BSR may be multiplexed (e.g., in the same slot).

As shown by reference number 846, the wireless communication relay 730 may transmit, and the access node 720 may receive, a message (e.g., UCI in a PUCCH or PUSCH) associated with a BSR retrieval response. For example, the wireless communication relay 730 may transmit the message to the access node 720 via the wireless signaling link. The BSR retrieval response may indicate the BSR provided by the network node 740.

As shown by reference number 847, the access node 720 may transmit (e.g., based on receiving the BSR), and the wireless communication relay 730 may receive, a message (e.g., a PDCCH communication, DCI in a PDCCH, a MAC CE in a PDSCH, and/or the like) associated with a packet retrieval request. For example, the access node 720 may transmit the message to the wireless communication relay 730 via the wireless signaling link. The packet retrieval request may provide an indication that the wireless communication relay 730 is to obtain a packet from the network node 740.

The packet retrieval request may identify scheduling information for scheduling transmission of the packet from the network node 740 (e.g., the packet retrieval request may be a scheduling request). The scheduling information may identify a resource, an identifier (e.g., an RNTI) associated with the network node 740, DCI, a beam, and/or the like, as described above in connection with FIG. 8A. Moreover, the packet retrieval request may identify a storage identifier for the packet that is to be retrieved, which the wireless communication relay 730 may use (e.g., to generate a mapping of the storage identifier to a storage location of the packet) when storing the packet, as described above in connection with FIG. 8A. In some aspects, the access node 720 may store information that associates the storage identifier with the wireless communication relay 730.

As shown by reference number 848, the wireless communication relay 730 may transmit (e.g., based at least in part on receiving the packet retrieval request), and the network node 740 may receive, via the wireless access link, a communication (e.g., a scheduling command) that schedules transmission of the packet from the network node 740 to the wireless communication relay 730. For example, the wireless communication relay 730 may transmit a PDCCH communication, as described above in connection with FIG. 8A, that schedules transmission of the packet. The communication that schedules transmission of the packet may be in accordance with the scheduling information of the packet retrieval request, as described above in connection with FIG. 8A.

The network node 740 may transmit, and the wireless communication relay 730 may receive, via the wireless access link, the packet in accordance with the scheduling (e.g., provided by the PDCCH communication). For example, the network node 740 may transmit the packet in a PUSCH (e.g., via a beam corresponding to the beam in which the PDCCH was received). In some aspects, the PDCCH scheduling the packet and the PUSCH carrying the packet may be multiplexed (e.g., in the same slot). In some aspects, the packet may contain user data or a sounding reference signal (i.e., data).

In some aspects, the wireless communication relay 730 may decode the packet and/or store the packet in association with the storage identifier identified in the packet retrieval request, as described above in connection with FIG. 8A. In some aspects, the wireless communication relay 730 may be unable to decode the packet and may not store the packet.

As shown by reference number 849, the wireless communication relay 730 may transmit, and the access node 720 may receive, a message (e.g., UCI in a PUCCH or PUSCH) associated with a packet retrieval response. For example, the wireless communication relay 730 may transmit the message to the access node 720 via the wireless signaling link. The packet retrieval response may provide ACK or NACK feedback for the packet transmission of the network node 740. In some aspects, if the wireless communication relay 730 was able to decode and/or store the packet, the packet retrieval response may include ACK feedback, and if the wireless communication relay 730 was unable to decode and/or store the packet, the packet retrieval response may include NACK feedback. If NACK feedback is provided by the wireless communication relay 730, the access node 720 may transmit a new packet retrieval request, as described above.

As shown by reference number 850, the access node 720 may transmit, and the wireless communication relay 730 may receive, a message (e.g., a PDCCH communication, DCI in a PDCCH, a MAC CE in a PDSCH, and/or the like) associated with a feedback request. For example, the access node 720 may transmit the message to the wireless communication relay 730 via the wireless signaling link. The feedback request may provide an indication that the wireless communication relay 730 is to provide ACK or NACK feedback (i.e., data) for the packet transmission to the network node 740. The feedback request may provide a further indication that the wireless communication relay 730 is to forward the stored packet to the access node 720.

The feedback request may identify scheduling information for transmitting the ACK or NACK feedback to the network node 740 (e.g., the feedback request may be a scheduling request). The scheduling information may identify a resource, an identifier (e.g., an RNTI) associated with the network node 740, DCI, a beam, and/or the like, as described above in connection with FIG. 8A. Moreover, the DCI of the scheduling information may indicate the ACK or NACK feedback for the packet transmission as provided by the wireless communication relay 730.

Furthermore, the feedback request may identify the storage identifier for the packet. That is, the feedback request may identify the same storage identifier that was indicated by the packet retrieval request for the packet. Accordingly, based at least in part on receiving the feedback request, the wireless communication relay 730 may obtain the packet from storage according to the storage identifier. In addition, the wireless communication relay 730 may re-encode the packet after obtaining the packet from storage.

As shown by reference number 851, the wireless communication relay 730 may transmit (e.g., based at least in part on receiving the feedback request), and the network node 740 may receive, via the wireless access link, a communication that provides the ACK or NACK feedback (e.g., provides the DCI). For example, the wireless communication relay 730 may transmit a PDCCH communication, as described above in connection with FIG. 8A, that provides the ACK or NACK feedback. The communication that provides the ACK or NACK feedback may be in accordance with the scheduling information of the feedback request, as described above in connection with FIG. 8A.

As shown by reference number 852, the access node 720 may transmit, and the wireless communication relay 730 may receive, via the wireless fronthaul link, a communication (e.g., a scheduling command) that schedules transmission of UCI (i.e., data) from the wireless communication relay 730 to the access node 720. For example, the wireless communication relay 730 may receive a PDCCH communication, as described above, that schedules transmission of the UCI.

The wireless communication relay 730 may transmit (e.g., in a PUCCH), and the access node 720 may receive, via the wireless fronthaul link, the UCI in accordance with the scheduling. In some aspects, the PDCCH scheduling the UCI and the PUCCH carrying the UCI may be multiplexed (e.g., in the same slot). In some aspects, the UCI may indicate a service request for an uplink transmission of the wireless communication relay 730 (e.g., an uplink transmission associated with the packet).

As shown by reference number 853, the access node 720 may transmit (e.g., based at least in part on receiving the service request), and the wireless communication relay 730 may receive, via the wireless fronthaul link, a communication (e.g., a scheduling command) that schedules transmission of a BSR (i.e., data) from the wireless communication relay 730 to the access node 720. For example, the wireless communication relay 730 may receive a PDCCH communication, as described above, that schedules transmission of the BSR, as described above.

The wireless communication relay 730 may determine a BSR and may transmit (e.g., in a PUSCH), and the access node 720 may receive, via the wireless fronthaul link, the BSR in accordance with the scheduling. In some aspects, the PDCCH scheduling the BSR and the PUSCH carrying the BSR may be multiplexed (e.g., in the same slot).

As shown by reference number 854, the access node 720 may transmit (e.g., based at least in part on the BSR), and the wireless communication relay 730 may receive, via the wireless fronthaul link, a communication (e.g., a scheduling command) that schedules transmission of the packet from the wireless communication relay 730 to the access node 720. For example, the wireless communication relay 730 may receive a PDCCH communication, as described above in connection with FIG. 8A, that schedules transmission of the packet.

The wireless communication relay 730 may transmit (e.g., in a PUSCH), and the access node 720 may receive, via the wireless fronthaul link, the packet in accordance with the scheduling. In some aspects, the PDCCH scheduling the packet and the PUSCH carrying the packet may be multiplexed (e.g., in the same slot).

As shown by reference number 855, the wireless communication relay 730 may transmit, and the access node 720 may receive, a message (e.g., a PUCCH communication, UCI in a PUCCH or PUSCH, a MAC CE in a PUSCH, and/or the like) associated with a forwarding request. For example, the access node 720 may transmit the message to the wireless communication relay 730 via the wireless signaling link. The forwarding request may provide an indication that the wireless communication relay 730 transmitted the packet, received from the network node 740, to the access node 720.

In such a case, the forwarding request may identify a reference for the packet that the access node 720 may use to identify the packet when the packet is received from the wireless communication relay 730, as described above in connection with FIG. 8A. Moreover, the forwarding request may identify a storage identifier for the packet, as described above in connection with FIG. 8A, which the access node 720 may use to identify the packet as originating from the network node 740. In some aspects, the access node 720 may decode the packet. In some aspects, the access node 720 may identify the packet (e.g., after decoding the packet) based at least in part on the reference identified in the forwarding request, as described above in connection with FIG. 8A. In addition, the access node 720 may determine that the packet originated from the network node 740 based at least in part on the storage identifier identified in the forwarding request. In this way, the access node 720 may schedule uplink transmissions of the network node 740 via the wireless communication relay 730, thereby maintaining centralized control and improving scheduling efficiency.

As indicated above, FIGS. 8A-8C are provided as examples. Other examples may differ from what is described with respect to FIGS. 8A-8C.

FIG. 9 is a diagram illustrating an example process 900 performed, for example, by a wireless communication relay, in accordance with various aspects of the present disclosure. Example process 900 is an example where a wireless communication relay (e.g., base station 110, relay station 110*d*, UE 120, and/or the like) performs operations associated with scheduling via wireless communication relay.

As shown in FIG. 9, in some aspects, process 900 may include receiving, via a first wireless link with a base station, a scheduling request that identifies scheduling information for scheduling transmission or reception of data via a second wireless link with a network node (block 910). For example, the wireless communication relay (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, via a first wireless link with a base station, a scheduling request that identifies scheduling information for scheduling transmission or reception of data via a second wireless link with a network node, as described above.

As further shown in FIG. 9, in some aspects, process 900 may include transmitting, via the second wireless link, a scheduling command in accordance with the scheduling information (block 920). For example, the wireless communication relay (e.g., using controller/processor 240, transmit processor 220, TX MIMO processor 230, MOD 232, antenna 234, and/or the like) may transmit, via the second wireless link, a scheduling command in accordance with the scheduling information, as described above.

As further shown in FIG. 9, in some aspects, process 900 may include transmitting or receiving, via the second wireless link, the data in accordance with the scheduling information (block 930). For example, the wireless communication relay (e.g., using antenna 234, DEMOD 232, MIMO detector 236, receive processor 238, controller/processor 240, transmit processor 220, TX MIMO processor 230, MOD 232, and/or the like) may transmit or receive, via the second wireless link, the data in accordance with the scheduling information, as described above.

Process 900 may include additional aspects, such as any single aspect or any combination of aspects described below and/or in connection with one or more other processes described elsewhere herein.

In a first aspect, the scheduling information identifies at least one of a resource that is to be used for the transmission or the reception of the data, an identifier associated with the network node, downlink control information, or a beam that is to be used for the transmission or the reception of the data.

In a second aspect, alone or in combination with the first aspect, the first wireless link is a wireless signaling link and the second wireless link is a wireless access link.

In a third aspect, alone or in combination with one or more of the first and second aspects, the data is at least one of user data, acknowledgment feedback, negative acknowledgment feedback, a service request, a buffer status report, uplink control information, a sounding reference signal, or a channel state information reference signal.

In a fourth aspect, alone or in combination with one or more of the first through third aspects, the data is transmitted via the second wireless link, and process 900 further includes receiving, via a third wireless link with the base station, the data prior to transmitting the data. In a fifth aspect, alone or in combination with one or more of the first through fourth aspects, the scheduling request identifies a reference for the data that is to be used to identify the data when receiving the data.

In a sixth aspect, alone or in combination with one or more of the first through fifth aspects, process 900 further includes receiving, via the first wireless link, a message that identifies a reference for the data that is to be used to identify the data when receiving the data. In a seventh aspect, alone or in combination with one or more of the first through sixth aspects, the message further identifies a storage identifier for the data, and process 900 further includes storing the data in association with the storage identifier. In an eighth aspect, alone or in combination with one or more of the first through seventh aspects, the scheduling request further identifies the storage identifier for the data, and process 900 further includes obtaining the data from storage according to the storage identifier prior to transmitting the data.

In a ninth aspect, alone or in combination with one or more of the first through eighth aspects, the data is received via the second wireless link, and process 900 further includes transmitting, via a third wireless link with the base station, the data after receiving the data. In a tenth aspect, alone or in combination with one or more of the first through ninth aspects, process 900 further includes transmitting, via the first wireless link, a message that identifies a reference for the data that is to be used to identify the data transmitted.

In an eleventh aspect, alone or in combination with one or more of the first through tenth aspects, the scheduling request further identifies a storage identifier for the data, and process 900 further includes storing the data in association with the storage identifier. In a twelfth aspect, alone or in combination with one or more of the first through eleventh aspects, process 900 further includes receiving, via the first wireless link, another scheduling command that identifies the storage identifier for the data, and obtaining the data from storage according to the storage identifier prior to transmitting the data according to the other scheduling command.

In a thirteenth aspect, alone or in combination with one or more of the first through twelfth aspects, the scheduling request is a forwarding request, an uplink control information retrieval request, a buffer status report retrieval request, a packet retrieval request, or a feedback request.

In a fourteenth aspect, alone or in combination with one or more of the first through thirteenth aspects, the scheduling request is received in a PDCCH communication, in DCI, or in a MAC CE. In a fifteenth aspect, alone or in combination with one or more of the first through fourteenth aspects, the scheduling request is received in resources indicating that the scheduling information is for forwarding to the network node.

In a sixteenth aspect, alone or in combination with one or more of the first through fifteenth aspects, the scheduling command is received in a physical downlink control channel. In a seventeenth aspect, alone or in combination with one or more of the first through sixteenth aspects, the data is transmitted or received in a PDSCH, a PUSCH, a PDCCH, or a PUCCH.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
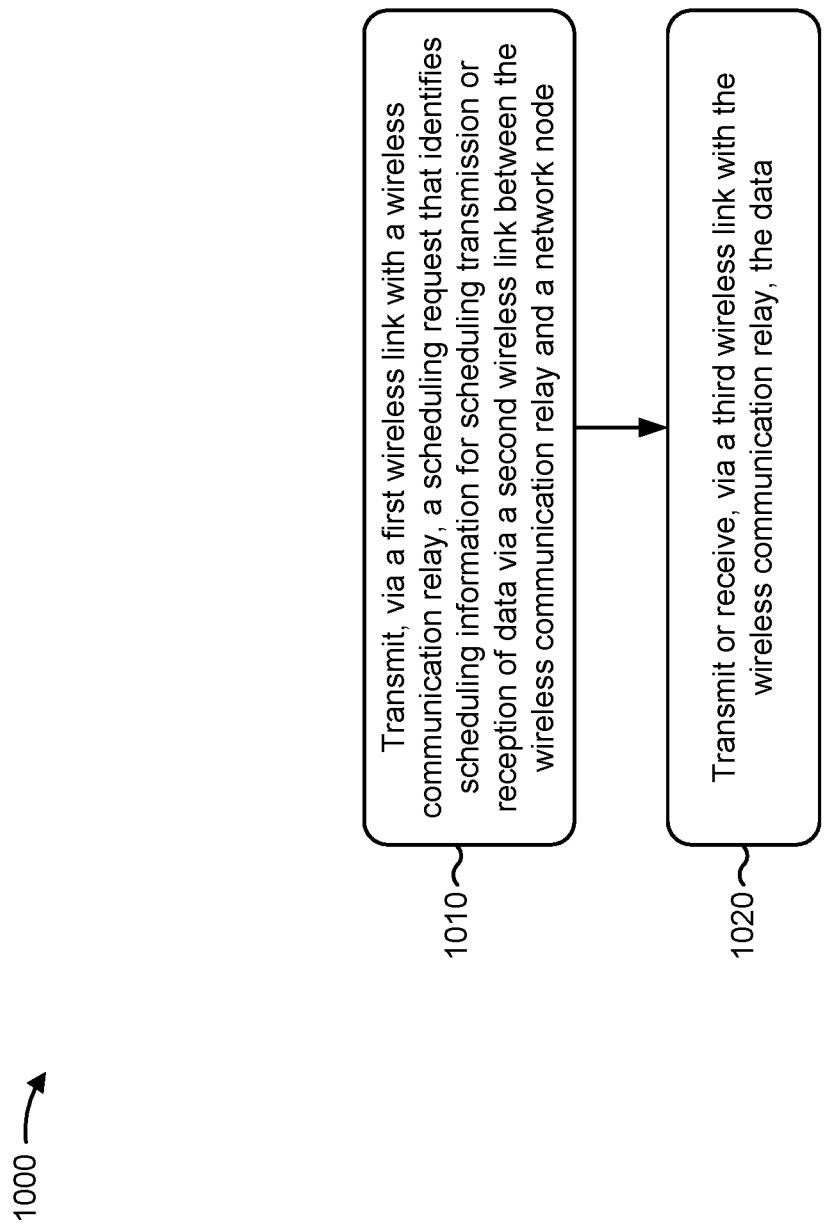
FIG. 10 is a diagram illustrating an example process performed, for example, by a base station, in accordance with various aspects of the present disclosure.

FIG. 10 is a diagram illustrating an example process 1000 performed, for example, by a base station (e.g., an access node), in accordance with various aspects of the present disclosure. Example process 1000 is an example where a base station (e.g., base station 110 and/or the like) performs operations associated with scheduling via wireless communication relay.

As shown in FIG. 10, in some aspects, process 1000 may include transmitting, via a first wireless link with a wireless communication relay, a scheduling request that identifies scheduling information for scheduling transmission or reception of data via a second wireless link between the wireless communication relay and a network node (block 1010). For example, the base station (e.g., using controller/processor 240, transmit processor 220, TX MIMO processor 230, MOD 232, antenna 234, and/or the like) may transmit, via a first wireless link with a wireless communication relay, a scheduling request that identifies scheduling information for scheduling transmission or reception of data via a second wireless link between the wireless communication relay and a network node, as described above.

As further shown in FIG. 10, in some aspects, process 1000 may include transmitting or receiving, via a third wireless link with the wireless communication relay, the data (block 1020). For example, the base station (e.g., using antenna 234, DEMOD 232, MIMO detector 236, receive processor 238, controller/processor 240, transmit processor 220, TX MIMO processor 230, MOD 232, and/or the like) may transmit or receive, via a third wireless link with the wireless communication relay, the data, as described above.

Process 1000 may include additional aspects, such as any single aspect or any combination of aspects described below and/or in connection with one or more other processes described elsewhere herein.

In a first aspect, the scheduling information identifies at least one of a resource that is to be used for the transmission or the reception of the data, an identifier associated with the network node, downlink control information, or a beam that is to be used for the transmission or the reception of the data.

In a second aspect, alone or in combination with the first aspect, the first wireless link is a wireless signaling link, the second wireless link is a wireless access link, and the third wireless link is a wireless fronthaul link.

In a third aspect, alone or in combination with one or more of the first and second aspects, the data is at least one of user data, acknowledgment feedback, negative acknowledgment feedback, a service request, a buffer status report, uplink control information, a sounding reference signal, or a channel state information reference signal.

In a fourth aspect, alone or in combination with one or more of the first through third aspects, the data is transmitted via the third wireless link, and the scheduling request identifies a reference for the data that is to be used to identify the data transmitted.

In a fifth aspect, alone or in combination with one or more of the first through fourth aspects, the data is transmitted via the third wireless link, and process 1000 further includes transmitting, via the first wireless link, a message that identifies a reference for the data that is to be used to identify the data transmitted. In a sixth aspect, alone or in combination with one or more of the first through fifth aspects, the message further identifies a storage identifier for the data and provides an indication to store the data. In a seventh aspect, alone or in combination with one or more of the first through sixth aspects, the scheduling request further identifies the storage identifier for the data.

In an eighth aspect, alone or in combination with one or more of the first through seventh aspects, the data is received via the third wireless link, and process 1000 further includes receiving, via the first wireless link, a message that identifies a reference for the data that is to be used to identify the data received.

In a ninth aspect, alone or in combination with one or more of the first through eighth aspects, the data is received via the third wireless link, and the scheduling request further identifies a storage identifier for the data and provides an indication to store the data. In a tenth aspect, alone or in combination with one or more of the first through ninth aspects, process 1000 further includes transmitting, via the first wireless link, a scheduling command that identifies the storage identifier for the data.

In an eleventh aspect, alone or in combination with one or more of the first through tenth aspects, the scheduling request is a forwarding request, an uplink control information retrieval request, a buffer status report retrieval request, a packet retrieval request, or a feedback request.

In a twelfth aspect, alone or in combination with one or more of the first through eleventh aspects, the scheduling request is transmitted in a PDCCH communication, in DCI, or in a MAC CE. In a thirteenth aspect, alone or in combination with one or more of the first through twelfth aspects, the scheduling request is transmitted in resources indicating that the scheduling information is for forwarding to the network node.

In a fourteenth aspect, alone or in combination with one or more of the first through thirteenth aspects, the data is transmitted or received in a PDSCH, a PUSCH, a PDCCH, or a PUCCH.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
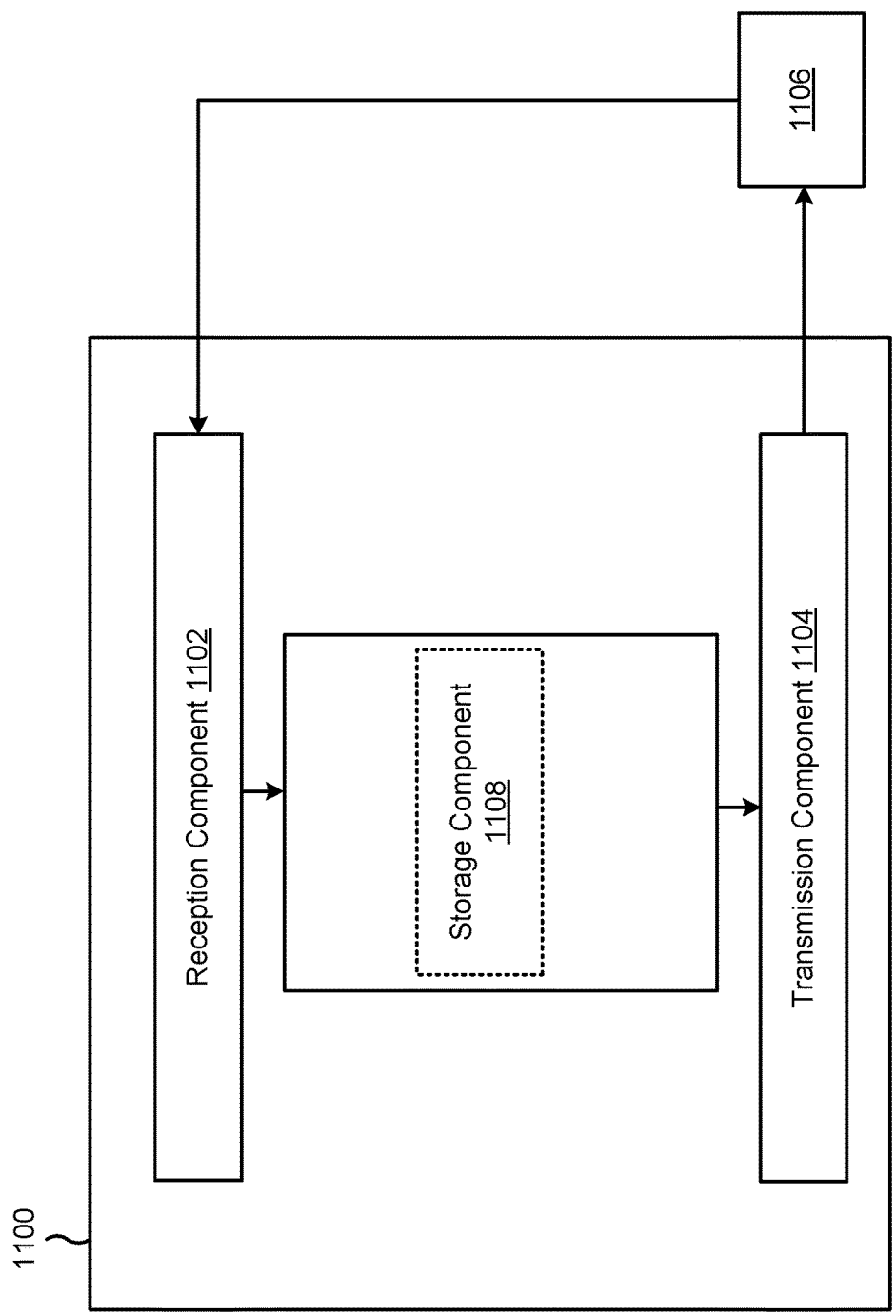
FIGS. 11-12 are block diagrams of example apparatuses for wireless communication, in accordance with various aspects of the present disclosure.

FIG. 11 is a block diagram of an example apparatus 1100 for wireless communication. The apparatus 1100 may be a wireless communication relay, or a wireless communication relay may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus

1106 (such as a UE, a base station, a relay, or another wireless communication device) using the reception component 1102 and the transmission component 1104. As further shown, the apparatus 1100 may include a storage component 1108, among other examples.

In some aspects, the apparatus 1100 may be configured to perform one or more operations described herein in connection with FIGS. 8A-8C. Additionally or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the wireless communication relay described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the wireless communication relay described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the wireless communication relay described above in connection with FIG. 2. In some aspects, the transmission component 1104 may be collocated with the reception component 1102 in a transceiver.

The reception component 1102 may receive, via a first wireless link with a base station, a scheduling request that identifies scheduling information for scheduling transmission or reception of data via a second wireless link with a network node. The transmission component 1104 may transmit, via the second wireless link, a scheduling command in accordance with the scheduling information. The transmission component 1104 may transmit, via the second wireless link, the data in accordance with the scheduling information. The reception component 1102 may receive, via the second wireless link, the data in accordance with the scheduling information.

The reception component 1102 may receive, via a third wireless link with the base station, the data prior to transmitting the data. The reception component 1102 may receive, via the first wireless link, a message that identifies a reference for the data that is to be used to identify the data when receiving the data.

The storage component 1108 may store the data in association with a storage identifier. The storage component 1108 may obtain the data from storage according to the storage identifier prior to transmitting the data. In some aspects, the storage component 1108 may include a controller/processor, a memory, or a combination thereof, of the wireless communication relay described above in connection with FIG. 2.

The transmission component 1104 may transmit, via a third wireless link with the base station, the data after receiving the data. The transmission component 1104 may transmit, via the first wireless link, a message that identifies a reference for the data that is to be used to identify the data transmitted.

The reception component 1102 may receive, via the first wireless link, another scheduling command that identifies a storage identifier for the data. The storage component 1108 may obtain the data from storage according to the storage identifier prior to transmitting the data according to the other scheduling command.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
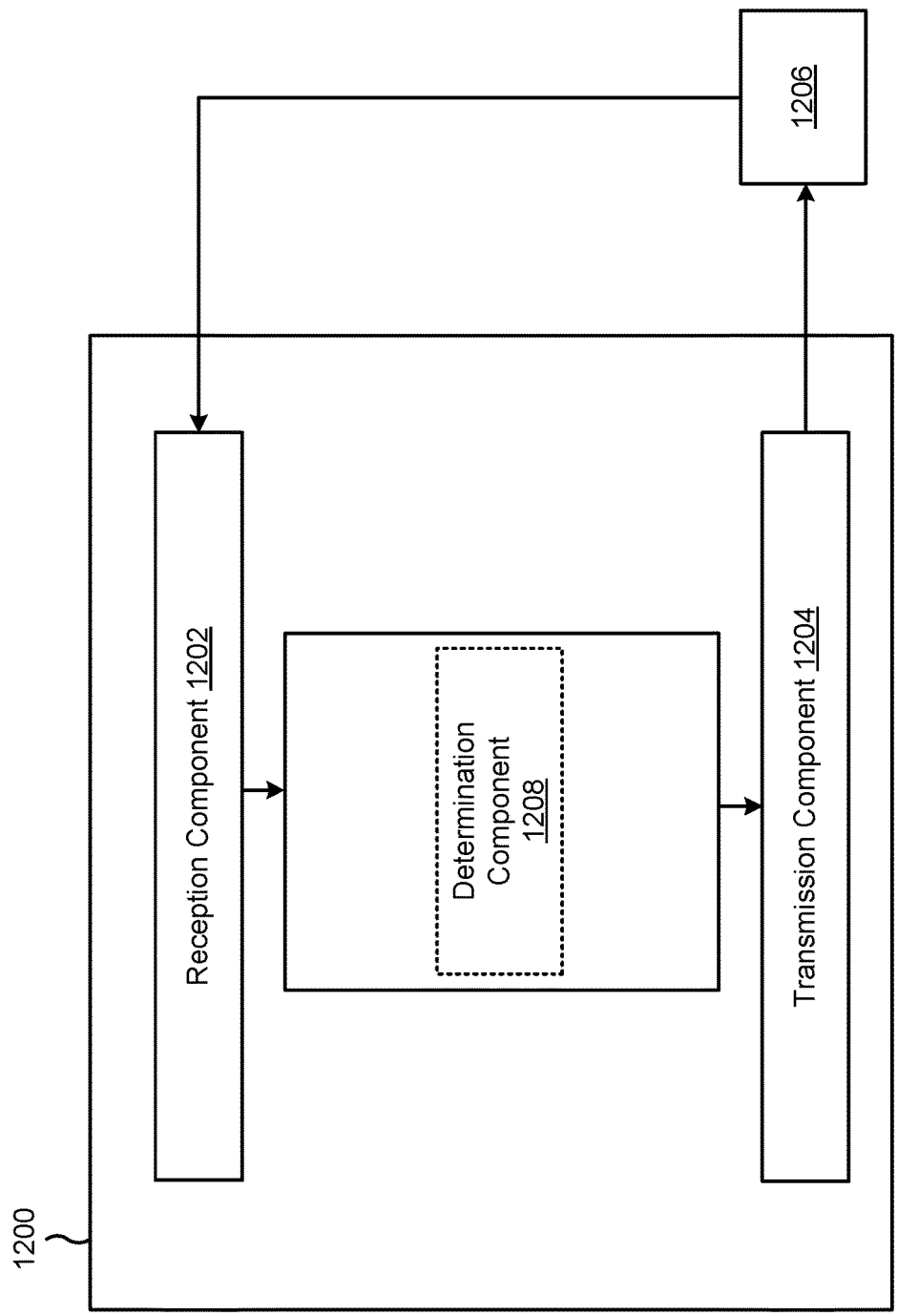

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, a relay, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 8A-8C. Additionally or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

The transmission component 1204 may transmit, via a first wireless link with a wireless communication relay, a scheduling request that identifies scheduling information for scheduling transmission or reception of data via a second wireless link between the wireless communication relay and a network node. The transmission component 1204 may transmit, via a third wireless link with the wireless communication relay, the data. The reception component 1202 may receive, via a third wireless link with the wireless communication relay, the data.

The transmission component 1204 may transmit, via the first wireless link, a message that identifies a reference for the data that is to be used to identify the data transmitted. The reception component 1202 may receive, via the first wireless link, a message that identifies a reference for the data that is to be used to identify the data received. The transmission component 1204 may transmit, via the first wireless link, a scheduling command that identifies a storage identifier for the data.

The determination component 1208 may determine the scheduling information. In some aspects, the determination component 1208 may include a controller/processor, a memory, or a combination thereof, of the base station described above in connection with FIG. 2.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication relay, comprising:
receiving, via a first wireless link with a network entity, a scheduling request that identifies scheduling information for scheduling transmission or reception of data via a second wireless link with a network node, wherein the scheduling information identifies a radio network identifier associated with the network node, and wherein the first wireless link is a wireless signaling link;
transmitting, by the wireless communication relay via the second wireless link, a scheduling command in accordance with the scheduling information; and
transmitting or receiving, via the second wireless link, the data in accordance with the scheduling information.

2. The method of claim 1, wherein the scheduling information identifies at least one of a resource that is to be used for the transmission or the reception of the data, downlink control information, or a beam that is to be used for the transmission or the reception of the data.

3. The method of claim 1, wherein the second wireless link is a wireless access link.

4. The method of claim 1, wherein the data is at least one of user data, acknowledgment feedback, negative acknowledgment feedback, a service request, a buffer status report, uplink control information, a sounding reference signal, or a channel state information reference signal.

5. The method of claim 1, wherein the data is transmitted via the second wireless link, and
wherein the method further comprises receiving, via a third wireless link with the network entity, the data prior to transmitting the data.

6. The method of claim 5, wherein the scheduling request identifies a reference for the data that is to be used to identify the data when receiving the data.

7. The method of claim 5, further comprising receiving, via the first wireless link, a message that identifies a reference for the data that is to be used to identify the data when receiving the data.

8. The method of claim 1, wherein the data is received via the second wireless link, and
wherein the method further comprises transmitting, via a third wireless link with the network entity, the data after receiving the data.

9. The method of claim 8, further comprising transmitting, via the first wireless link, a message that identifies a reference for the data that is to be used to identify the data transmitted.

10. The method of claim 1, wherein the scheduling request is a forwarding request, an uplink control information retrieval request, a buffer status report retrieval request, a packet retrieval request, or a feedback request.

11. The method of claim 1, wherein the scheduling request is received in a physical downlink control channel communication, in downlink control information, or in a medium access control control element.

12. The method of claim 1, wherein the scheduling request is received in resources indicating that the scheduling information is for forwarding to the network node.

13. The method of claim 1, wherein the scheduling command is transmitted in a physical downlink control channel.

14. The method of claim 1, wherein the data is transmitted or received in a physical downlink shared channel, a physical uplink shared channel, a physical downlink control channel, or a physical uplink control channel.

15. A method of wireless communication performed by a network entity, comprising:
transmitting, via a first wireless link with a wireless communication relay, a scheduling request that identifies scheduling information for scheduling transmission or reception of data via a second wireless link between the wireless communication relay and a network node, wherein the scheduling information identifies a radio network identifier associated with the wireless communication relay or the network node, and wherein the first wireless link is a wireless signaling link; and
transmitting or receiving, via a third wireless link with the wireless communication relay, the data.

16. The method of claim 15, wherein the scheduling information identifies at least one of a resource that is to be used for the transmission or the reception of the data, downlink control information, or a beam that is to be used for the transmission or the reception of the data.

17. The method of claim 15, wherein the second wireless link is a wireless access link and the third wireless link is a wireless fronthaul link.

18. The method of claim 15, wherein the data is at least one of user data, acknowledgment feedback, negative acknowledgment feedback, a service request, a buffer status report, uplink control information, a sounding reference signal, or a channel state information reference signal.

19. The method of claim 15, wherein the data is transmitted via the third wireless link, and
wherein the scheduling request identifies a reference for the data that is to be used to identify the data transmitted.

20. The method of claim 15, wherein the data is transmitted via the third wireless link, and
wherein the method further comprises transmitting, via the first wireless link, a message that identifies a reference for the data that is to be used to identify the data transmitted.

21. The method of claim 15, wherein the data is received via the third wireless link, and
wherein the method further comprises receiving, via the first wireless link, a message that identifies a reference for the data that is to be used to identify the data received.

22. The method of claim 15, wherein the scheduling request is a forwarding request, an uplink control information retrieval request, a buffer status report retrieval request, a packet retrieval request, or a feedback request.

23. The method of claim 15, wherein the scheduling request is transmitted in a physical downlink control channel communication, in downlink control information, or in a medium access control control element.

24. The method of claim 15, wherein the scheduling request is transmitted in resources indicating that the scheduling information is for forwarding to the network node.

25. The method of claim 15, wherein the data is transmitted or received in a physical downlink shared channel, a physical uplink shared channel, a physical downlink control channel, or a physical uplink control channel.

26. A wireless communication relay for wireless communication, comprising:
one or more memories; and
one or more processors coupled to the one or more memories, the one or more processors configured to:
receive, via a first wireless link with a network entity, a scheduling request that identifies scheduling information for scheduling transmission or reception of data via a second wireless link with a network node, wherein the scheduling information identifies a radio network identifier associated with the network node, and wherein the first wireless link is a wireless signaling link;
transmit, via the second wireless link, a scheduling command in accordance with the scheduling information; and
transmit or receive, via the second wireless link, the data in accordance with the scheduling information.

27. The wireless communication relay of claim 26, wherein the second wireless link is a wireless access link.

28. The wireless communication relay of claim 26, wherein the data is transmitted via the second wireless link, and wherein the one or more processors are further configured to receive, via a third wireless link with the network entity, the data prior to transmitting the data.

29. A network entity for wireless communication, comprising:
one or more memories; and
one or more processors coupled to the one or more memories, the one or more processors configured to:
transmit, via a first wireless link with a wireless communication relay, a scheduling request that identifies scheduling information for scheduling transmission or reception of data via a second wireless link between the wireless communication relay and a network node, wherein the scheduling information identifies a radio network identifier associated with the wireless communication relay, the network node, or a combination thereof, and wherein the first wireless link is a wireless signaling link; and
transmit or receive, via a third wireless link with the wireless communication relay, the data.

30. The network entity of claim 29, wherein the second wireless link is a wireless access link and the third wireless link is a wireless fronthaul link.

* * * * *